(12) United States Patent
Tomasi et al.

(10) Patent No.: US 6,529,821 B2
(45) Date of Patent: Mar. 4, 2003

(54) ROUTE PLANNER WITH AREA AVOIDANCE CAPABILITY

(75) Inventors: Steven W. Tomasi, Windham, NH (US); Karen Benevides, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/874,464

(22) Filed: Jun. 5, 2001

(65) Prior Publication Data

US 2002/0183922 A1 Dec. 5, 2002

(51) Int. Cl.$^7$ ................................. F41G 7/34
(52) U.S. Cl. ................ 701/202; 701/300; 701/301; 701/23; 342/65; 244/3.1; 102/501
(58) Field of Search ................. 701/23, 202, 300, 701/301, 302; 342/65, 69; 244/3.1, 3.15; 102/501; 89/1.1

(56) References Cited

U.S. PATENT DOCUMENTS 5,788,179 A * 8/1998 Wicke .................. 244/3.15
5,838,562 A * 11/1998 Gudat et al. ............... 701/213

* cited by examiner

Primary Examiner—William A. Cuchlinski, Jr.
Assistant Examiner—Marthe Y. Marc-Coleman
(74) Attorney, Agent, or Firm—Michael J. McGowan; Michael F. Oglo; James M. Kasischke

(57) ABSTRACT

A method for establishing a path from a launch point to a destination point that can include multiple way points while avoiding landmass areas. Launch points and destination points can lie outside or inside the particular landmass areas. The method includes steps for defining tangents path areas to be avoided, extending those tangents to define way points and testing the individual way points to assure conformance to various conditions and constraints. A subset of paths are optimized. The shortest of the optimized paths becomes a final path.

32 Claims, 20 Drawing Sheets

ROUTE PLANNER WITH AREA AVOIDANCE CAPABILITY

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

Not applicable.

BACKGROUND OF THE INVENTION (1) Field of the Invention

This invention generally relates to navigational systems and more specifically to the generation of a route with intermediate way points that avoid predetermined areas.

(2) Description of the Prior Art

A number of navigation systems exist that have the capability of plotting a course from an initial point to a destination. Often times these courses involve individual paths or legs to intermediate way points. Many of these systems take into account various terrain features in plotting such a course and locating particular way points.

For example, U.S. Pat. No. 4,812,990 (1989) to Adams et al. discloses a system and method for determining the optimal path for an aircraft. A two-dimensional reference grid is constructed so that a first position is in the center of a first rank of the grid and a second position is adjacent to the center cell of the last rank. Dynamic programming techniques enable the determination of possible flight paths between the first and second positions and the selection of a path of minimum cost. Possible flight paths are constructed by identifying possible connections between the last rank and the second position and then between each pair of adjacent ranks, working backward from the last rank to the first position in the first rank. A possible connection is deemed to exist when an aircraft can fly from one point to a target point, as between specified cells and adjacent ranks, and arrive at the target point within particular heading limits without exceeding a predetermined maximum lateral exhilaration of the aircraft. Corresponding heading limits are determined for each connected cell on the grid so that all possible flight paths are examined consistent with preselected heading limits at the second position and the maximum lateral exhilaration allowed for the aircraft. In essence therefore, this patent discloses a system that establishes a flight path with intermediate way points that take into account certain constraints on the aircraft.

U.S. Pat. No. 5,086,396 (1992) to Waruazewski discloses an aircraft navigation system for use in determining routes in unfamiliar terrain or in terrain having hostile forces. The navigation system includes an inertial navigation system, a map of the terrain with elevational information stored in digitized format as a function of location, a typical energy managed or narrow beam altimeter, a display system and a central processing unit for processing data according to preselected programs. The system operates to maintain the true position of the aircraft with respect to the digitized map. A display of the map and the aircraft provide presentations useful to the navigation of the aircraft and enable the aircraft to engage in terrain following procedures using only the relatively difficult to detect altitude range finding apparatus as a source of emitted electromagnetic radiation. The navigation system, in conjunction with and information regarding hostile anti-aircraft facilities, can provide a display permitting an operator to determine a reduced risk flight path. This patent therefore discloses a navigation system that provides a means for enabling an aircraft operator to determine an appropriate route to avoid particular areas.

U.S. Pat. No. 5,087,916 (1992) to Metzdorff et al. discloses a method for navigating and updating navigation information by means of range imaging processing and a reference store that segmentizes range image data in order to obtain a particular pattern of type features for purposes of classifying particular types of objects across which the aircraft flies. The system extracts particular signature features including localized elevational jumps and determines the position of the aircraft by correlating a plurality of features and their spatial orientation to each other as extracted with corresponding stored reference information. This provides a maximum fit that is indicative of deviation of a flight from a flight path as identified by reference information. Thus this patent discloses a system that utilizes images and data base information containing terrain features to determine flight deviation from a predetermined path.

U.S. Pat. No. 5,187,667 (1993) to Short discloses a tactical route planning method for determining tactically sound paths or routes for vehicles from an initial position to a goal position across a piece of terrain. The system uses heuristic methods to select the most promising paths by sorting a list using a minimum estimated total cost value. If any of the list of paths reaches the goal it is selected. Otherwise new paths are generated by moving from the position at the end of the path to each of the adjacent terrain sections. Thus this patent discloses a method of obtaining a final path from a plurality of available paths.

U.S. Pat. No. 5,204,817 (1993) to Yoshida discloses a car mounted navigation system that uses map data in the form of polygons defined by roads of a predetermined rank or more of significance to connect a starting polygon containing a starting point to a destination polygon containing a destination with a chain of polygons adjoining at common sides of each pair of adjoining polygons and arranged between the starting and destination polygons to compute a plurality of routes extending from the starting point to the destination polygon. Each route can include a combination of sides of the chained polygons, the starting polygon and the destination polygon. A car operator selects an appropriate route from the computed routes. Thus this patent discloses a navigation system that divides an area into polygonal structures for use in generating one of a possible number of routes.

Generally, each of the foregoing applications discloses a system that is capable of plotting a navigation route. However, in each case the route can be plotted over an interval that is not time dependent. That is, the initial and final points remain fixed for a long period in comparison to the duration of an event. Time dependence, however, becomes an issue when in a dynamic situation such as determining a flight path for a missile in a tactical situation where the launch site for the missile is U.S. Pat. No. 3,990,657 (1976) to Schott discloses a method and apparatus for reducing ballistic missile range errors due to viscosity uncertainties. Predictions of these errors provide a missile circular error probability in the form of a ballistic position error ellipse. The ellipse can be used to significantly improve performance by reducing error probability. This patent therefore discloses the use of ellipses in determining navigational information in a more dynamic scenario.

U.S. Pat. No. 4,044,237 (1977) to Cowgill et al. discloses a lifting body missile that is controlled by pitch and roll commands. A yaw auto pilot is caused to change in accordance with roll and estimated angle of attack input information. Command logic determines the polarity of the command signals to the auto pilot. This patent discloses onboard real-time apparatus for improving the trajectory of a missile.

U.S. Pat. No. 4,529,151 (1985) to Skarman discloses a method for steering an aerodynamic body in response to a body control variable signal. Specifically, the system responds to a signal value representing a line of sight angular rate and a signal value representing a body attitude angular rate. The two signal values are combined to form a signal value of an error angle. A difference error angle signal value is formed by an error angle measurement received from a homing device. The approximate error angle signal is fed back to the aerodynamic relationships in order to update the quantities of the relationships. This patent therefore provides a guidance system for moving a device from a launching point to a destination point in response to a target device that is moving.

In summary, each of these references discloses various approaches for guiding a vehicle from a starting point to a destination point. However, none of these references discloses any method or means for defining a route with intermediate way points set to avoid particular areas. Further, none of these references discloses any method or means for defining such a route in situations where the location of a starting point or distribution point may vary with time.

SUMMARY OF THE INVENTION

Therefore it is an object of this invention to provide a method for establishing a route through a plurality of way points positioned to avoid particular areas between a starting or launch point and a destination point.

Another object of this invention is to provide a method for establishing a route with intermediate way points between a starting or launch point and a destination point that enables the system to select the best possible route.

Still another object of this invention is to provide a method for establishing a route with intermediate way points between a starting or launch point and a destination point that enables the system to select a best possible route on a real-time basis.

Yet another object of this invention is to provide a method for establishing a flight path for a missile with intermediate way points between a starting or launch point and a destination point that enables the system to select a best possible flight path taking into account any constraints on the maneuverability of the missile.

A method according to this invention establishes at least one way point on a route for a steerable vehicle between a source point and a destination point that avoids at least one intermediate obstacle or area by defining first and second bearing lines from the source point to first and second tangents of each obstacle. Each of the bearing lines is extended an incremental distance beyond its tangent point with the area to define a potential way point. Thereafter each potential way point is converted to a way point for a route.

According to another aspect of this invention, a route is established for a missile between a launch point and a destination point that avoids at least one intermediate landmass or area. The method includes establishing a data base of landmasses in which each landmass is circumscribed with a polygon defined by a plurality of data points. After defining an initial source point and final way point, the method iteratively generates a plurality of routes between the initial source point and final way point. The final way point is the destination point unless destination is inside an obstacle (i.e., land mass boundary). During each iteration first and second bearing lines are generated from the source point to first and second tangents of the polygons surrounding each intermediate landmass. A potential way point relative to the tangent of each bearing line to the polygon is defined. Thereafter each potential way point is converted to an intermediate way point for the route and this way point is substituted as the source point. This process produces a number of routes. One of those routes is selected as a final route for the missile between the launching and destination points.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

This invention enables the development of a flight plan for a vehicle, such as a missile, from a launch point to a destination point such that the missile flight path avoids predetermined landmasses or other geographical areas. More specifically, a flight plan generated in accordance with this invention will include a route with one or more intermediate way points that is the shortest possible path between the launch point and destination point taking into consideration the maneuvering capabilities of the vehicle, or missile. An understanding of the operation and advantages of this invention can be enhanced by describing the invention first in the context of both direct and indirect flight paths between the launch and destination points and thereafter in a context in which either or both of the launch and destination points are proximate to or even within such landmasses or geographical areas.

Figure 1:
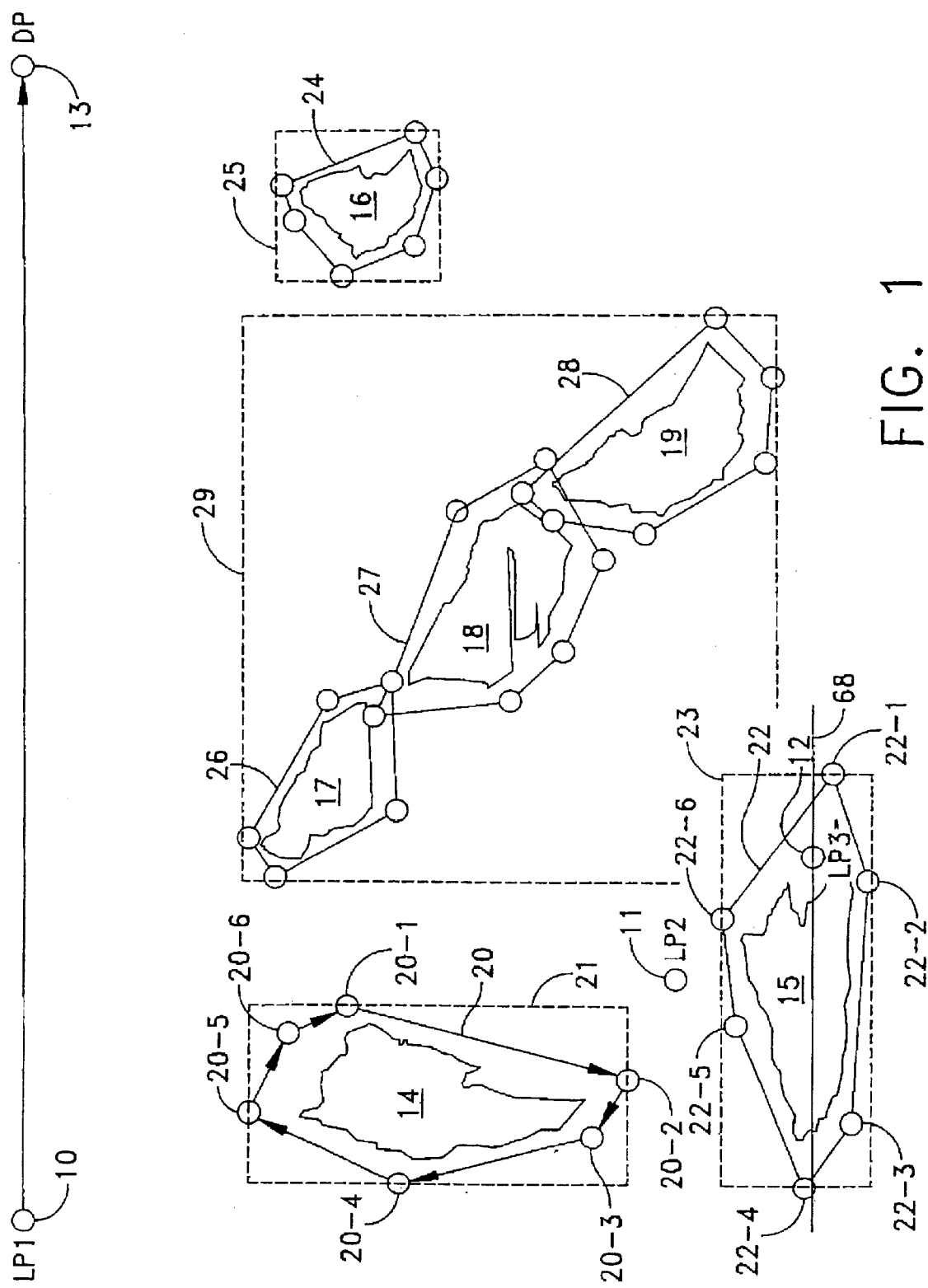
FIG. 1 is a map that depicts a launch point, destination point and landmasses as a background against which this invention can be utilized and that depicts a direct flight route from a first launch point to a destination point.

FIG. 1 depicts a map with three potential starting or launch points 10, 11 and 12 designated LP1, LP2 and LP3, and a final destination point (DP) 13. The map of FIG. 1 also contains landmasses 14 through 19 that represent geographical areas to be avoided during a flight as the vehicle travels from a launch point to a destination point. As apparent from inspection, a direct route exists between the LP1 launch point 10 and the destination point 13. However, a direct route to the DP destination point 13 from either the LP2 launch point 11 or the LP3 launch point 12 crosses landmasses. Particularly, both the paths from the LP2 launch point 11 and the LP3 launch point 12 cross the landmass 18. This invention enables a real time generation of flight paths from the LP2 launch point 11 and the LP3 launch point 12 to the destination point 13 that define at least one intermediate way point thereby to establish a route that avoids any landmasses.

A precursor to the generation of such a flight path is the generation of certain data concerning landmasses of interest will be stored in a data base. The data for each landmass will contain a landmass identification, the parameters of a circumscribing polygon and the parameters of a min/max rectangle. There will also be a field for receiving data concerning the position of a destination point relative to the landmass.

For example, in FIG. 1 a polygon 20 with data points 20-1 through 20-6 circumscribes the landmass 14. The exact position and number of data points are arbitrary, but typically will define a polygon that is located completely outside the landmass. The polygon definition could be according to any number of systems, as, for example, a latitude/longitude system. In such a system, the sides of each polygon can be defined as vectors from one data point to an adjacent data point in a particular direction. In this example it is assumed that the direction is clockwise so that a vector could be defined from the data point 20-1 to the data point 20-2 in terms of a bearing and range. Procedures for generating a vector having bearing and range information between two way points is well known in the art. In the following discussion such a vector has the general designation Vn(i,j) where "n" is the polygon number and "i" and "j" are successive data point numbers for the polygon. For example, the vector from data point 20-1 to data point 20-2 is V20(1,2) and the vector from the data point 20-6 to the data point 20-1 is V20 (6,1).

A landmass min/max rectangle is the smallest rectangle that circumscribes a landmass or group of interconnected landmasses. Typically a landmass min/max rectangle will have sides lying on the north-south and east-west axes. One such landmass min/max rectangle 21 circumscribes the landmass 14 and is determined by the data points 20-1, 20-2, 20-4 and 20-5.

The data base contains similar data for defining the remaining landmasses. A polygon 22 and a landmass min/max rectangle 23 define the landmass 15; a polygon 24 and a landmass min/max rectangle 25, the landmass 16. Polygons 26, 27 and 28 define the landmasses 17, 18 and 19 respectively. As apparent, the polygon 27 has data points or segments lying within the polygons 26 and 28. A landmass min/max rectangle 29 therefore circumscribes the totality of the landmasses 17, 18 and 19 defined by the corresponding intersecting polygons 26 through 28. In this particular example the extreme positions on the polygons 26 and 28 define the landmass min/max rectangle 29.

Figure 2:
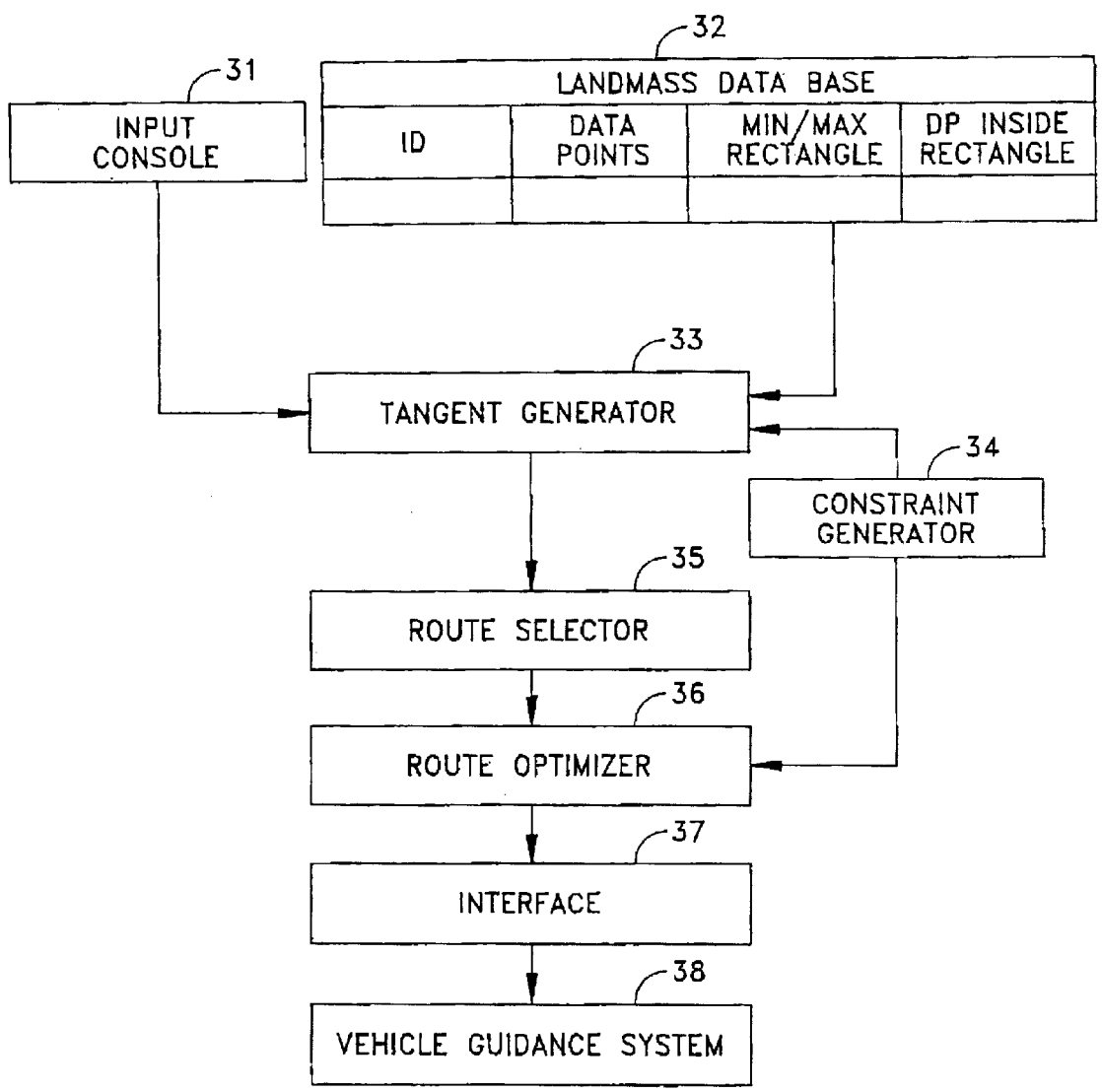
FIG. 2 is a block diagram of apparatus embodying this invention.

Referring now to FIG. 2 a system 30 for producing the different paths from the LP1, LP2 and LP3 launch points 10, 11 and 12 respectively to the DP destination point 13 in FIG. 1 will include an input console 31 and a landmass data base 32 containing the aforementioned information about landmasses of interest. For any particular solution, the system references a limited number of landmasses from the data base 32. A tangent generator 33 produces information in conjunction with a constraint generator 34. A route selector 35 and a route optimizer 36 produce the best route from a given launch point to the destination point. An interface 37 provides a means for transferring the selected path to a vehicle guidance system 38. Each of the foregoing elements can comprise a circuit module or a software module in a general or special purpose digital computer. Consequently, each element will be described functionally. The particular form of implementation is well within the capabilities of persons of ordinary skill in the relevant art.

Figure 3:
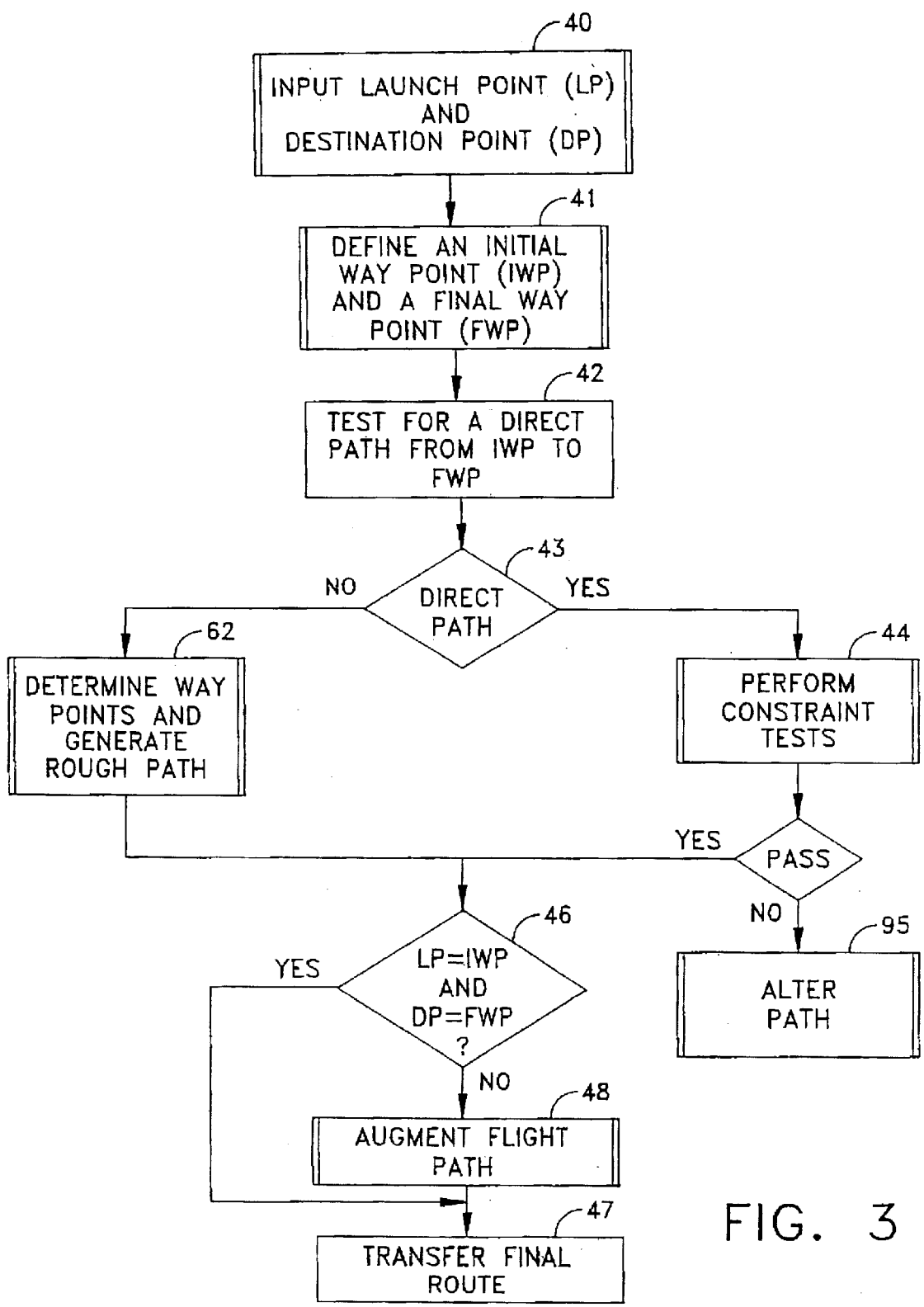
FIG. 3 is a basic flow diagram depicting general operations and procedures according to this invention.

Referring to FIG. 3, as an initial step an operator will use step 40 in FIG. 3 to input a launch point (LP) and a destination point (DP) through the input console 31 of FIG. 2. For example, the operator could input the latitude and longitude for each. The tangent generator 33 uses this information and the landmass information to generate possible routes from the launch point to the destination point. More specifically, a procedure 41 defines an initial way point (IWP) and a final way point (FWP) as described later. For purposes of understanding the operation of the system in connection with a path from the LP1 launch point 10 to the destination point 13, the LP1 launch position 10 is the initial way point and the destination point 13 is the final way point in the procedure 41.

In analyzing this path the system of FIG. 2 or resulting control program in a general purpose digital computer tests for a direct path between the initial way point and the final way point in step 42. If a direct route exists, as from the LP1 launch point 10, step 43 transfers control to a procedure 44 that performs various constraint tests on the route. As disclosed later these typically relate to the length of flight paths between maneuvers and minimum or maximum maneuver angles. Assuming that the flight path from the LP1 launch point 10 to the destination point 13 satisfies the constraints, step 45 diverts control to procedure 46. In this particular example the launch point and destination points are the initial way points and final way points respectively, so no further action is necessary. Step 47 transfers the flight path information through the interface 37 to the vehicle guidance system 38 as shown in FIG. 2. Thus, for the flight path between the LP1 launch point 10 and the destination point 13, the system computes a direct flight path because there are no intermediate landmasses to be avoided.

Procedure 41 and step 46 determine and utilize initial and final way points. Generally, but not necessarily, the launch point and destination point will lie outside the polygons around the landmasses. In FIG. 1, the LP1 and LP2 launch points 10 and 11 and the DP destination point 13 all lie outside any polygons and outside any landmass min/max rectangle. In such scenarios, the launch point and initial way point are identical and the destination point and final way point are identical. However, either or both of the launch point or destination point can lie within a polygon. The LP3 launch point 12 is an example of a launch point lying within a polygon. In such an event it will be necessary for a portion of the flight path to pass over a landmass line segment. The path to or from a way point within a land mass is to or from an initial or final point.

Figure 4:
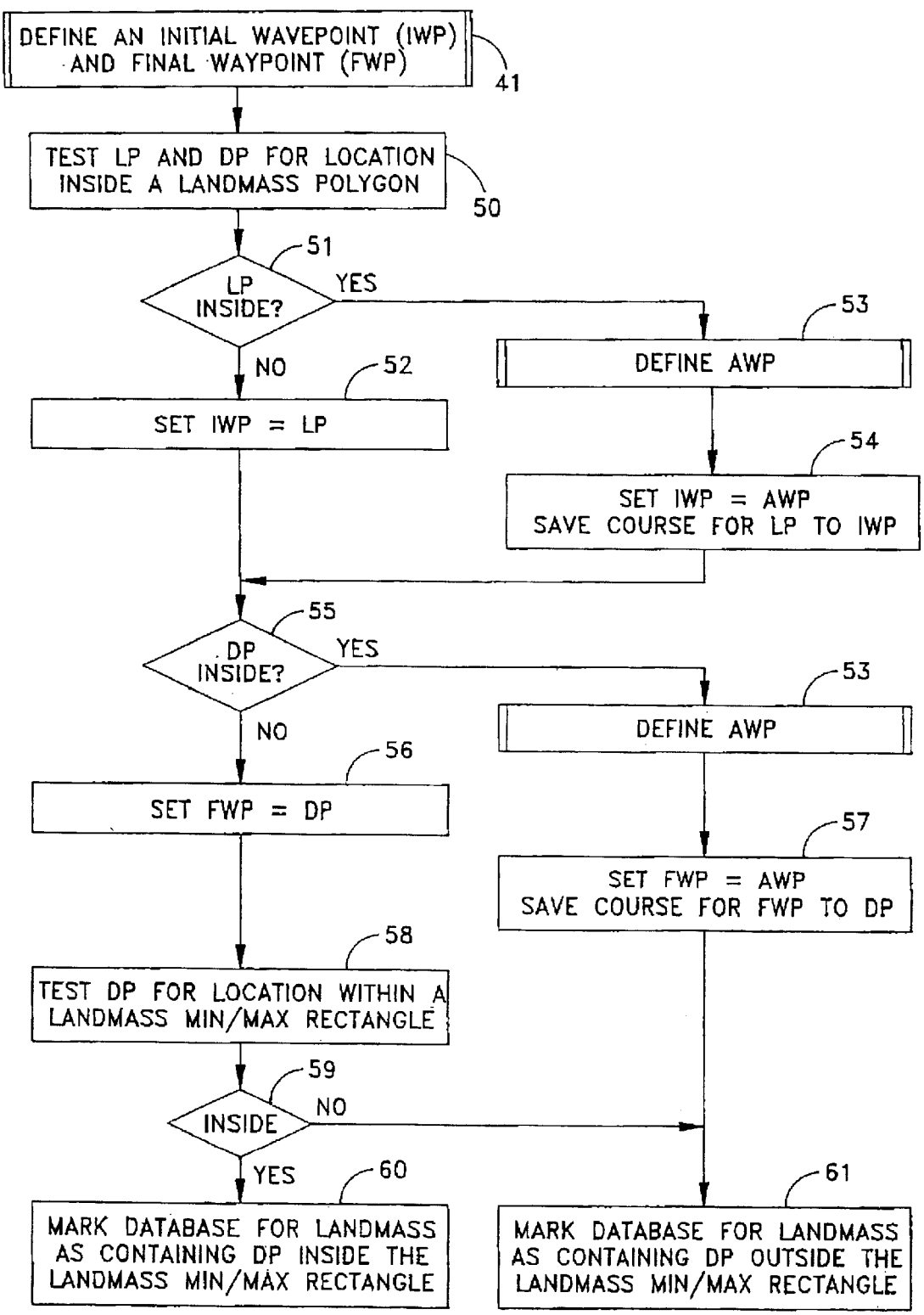
FIGS. 4 through 6 depict a procedure of FIG. 3 for defining initial and final way points.

Procedure 41 in FIG. 3 takes these possibilities into account. Referring to FIG. 4, a first step 50 in procedure 41 determines whether either the launch point or the destination point is located within a landmass polygon. In the example of FIG. 1, neither of the LP1 or LP2 launch points 10 and 11 are within any landmass polygon. Consequently, and as previously indicated, step 51 diverts to step 52 to set an initial way point (IWP) to the launch point (LP). For a path from the LP3 launch point 12 within the landmass polygon 22 in FIG. 1, step 51 in FIG. 4 diverts to a procedure 53 for defining an auxiliary way point (AWP) as described later. Once that auxiliary way point has been established, it is set as the initial way point (IWP) and the course from the launch point to the initial way point is saved in step 54.

A similar set of steps provides the final way point (FWP). In this particular example the destination point 13 lies outside any landmass polygon so step 55 diverts to step 56 whereupon the FWP is set to be the destination point (DP). If the destination point were within a landmass polygon, the procedure 53 would define an auxiliary way point for the destination point. Then in step 57 the system would set the final way point (FWP) to the auxiliary way point and save the course from the final way point (FWP) to the destination point (DP).

The final test in FIG. 4 determines, in step 58, whether the destination point (DP) lies within a landmass min/max rectangle but outside the corresponding landmass polygon. If such a condition exists, step 59 diverts to step 60 to mark the data base for the corresponding landmass as containing a destination point within the landmass min/max rectangle. By implication from the path in FIG. 4, step 60 is only used if the destination point meets the additional criteria of lying outside the corresponding landmass polygon. If the destination point 13 were inside a polygon, the path would be through step 57 so the landmass would not be marked. Step 61 defines the converse state. As will be seen, steps 60 and 61 provide a basis for making a decision concerning alternatives used in the procedure 62 in FIG. 3 that determines intermediate way points when a direct path does not exist.

Figure 5:
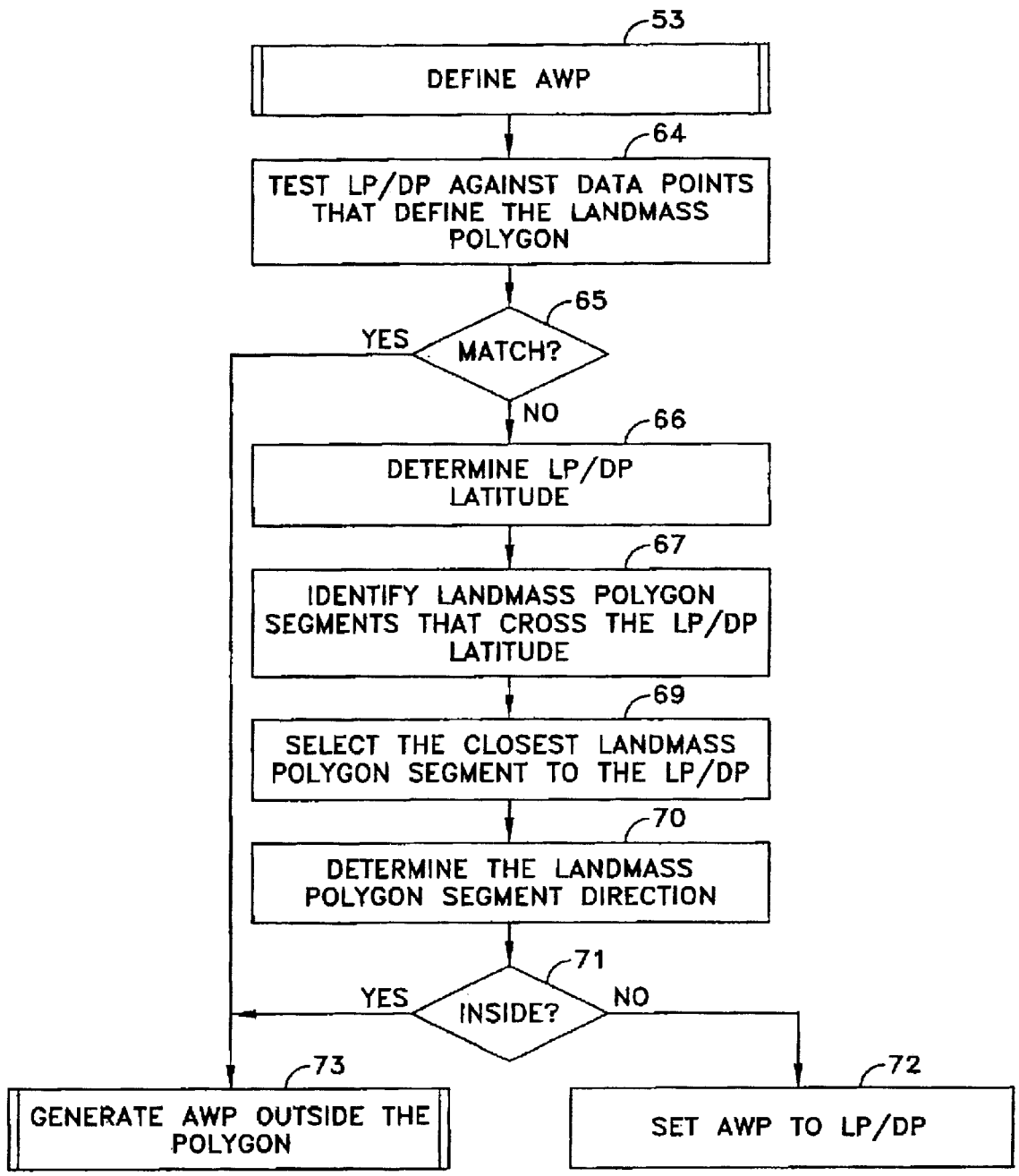

FIG. 5 depicts the procedure 53 in FIG. 4 for defining an auxiliary way point (AWP). Whenever a launch point or destination point (DP), such as the LP3 launch point 12, lies within a landmass polygon, the procedure 53 initially tests the launch point or destination point (designated "LP/DP") against the data points that define the surrounding landmass polygon in step 64 of FIG. 5. In the particular example of FIG. 1 none of the data points directly match the LP3 launch point 12, so step 65 diverts to step 66 to determine whether the LP3 launch point 13 actually lies within the polygon 23. Step 66 determines the latitude through the LP3 launch point 12. Step 67 identifies polygon segments that cross the LP/DP latitude. In this particular example two such segments corresponding to vectors 22(6,1) and 22(3,4) cross the latitude line represented by line 68 in FIG. 1. The closest landmass polygon segment is then selected in step 66. By inspection in this case that is the segment corresponding to vector 22(6,1). Assuming a clockwise vector rotation, the segment corresponding to vector 22(6,1) has a direction generally from north to south. Consequently from this step 70 can determine that the LP3 launch point 12 lies within the polygon 22.

If the launch point or destination point is outside a polygon, step 71 diverts to step 72 thereby to set AWP to the value of a launch point or destination point. This would occur for each of the LP1 and LP2 launch points 10 and 11 and for the destination point 13. If a launch point is being analyzed, step 54 of FIG. 4 sets the initial way point (IWP) to the launch point. In situations exemplified by the positions of the LP3 launch point 12, step 71 diverts to procedure 73 that generates an AWP outside the boundary defined by the polygon, such as polygon 22. That AWP then becomes the IWP or FWP depending upon whether the launch point or destination point is being analyzed.

Figure 6:
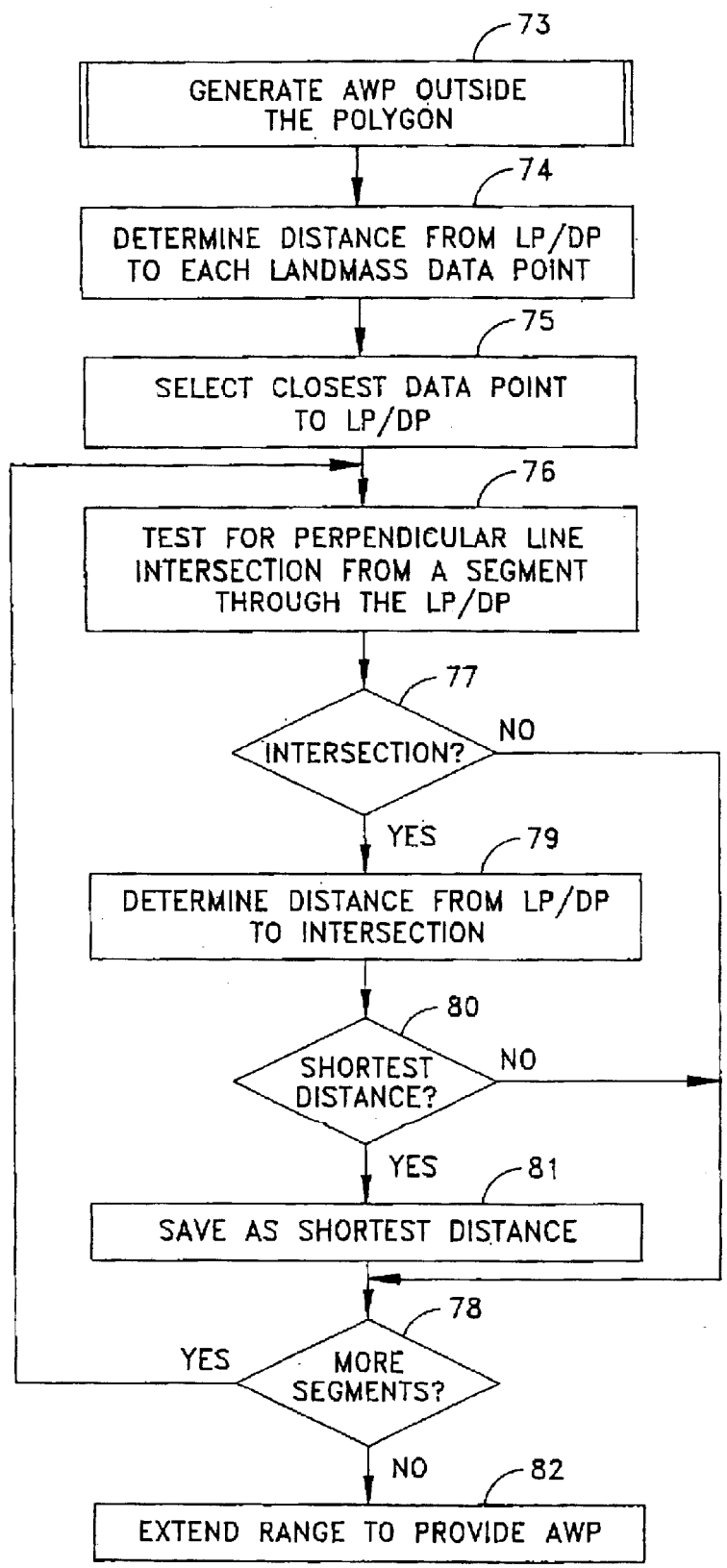

The procedure 73 for generating the AWP outside a polygon is depicted in FIG. 6. Step 74 determines the distance from the LP/DP, that in this case the LP3 launch point 12, to each landmass data point in the polygon 23. In step 75 the system selects the closest data point. As shown in FIG. 1, that would be the data point 22-1. Step 76 then tests to determine if a perpendicular line exists from any of the segments that additionally intersect the LP/DP. If an intersection does not exist, as for example for the segment corresponding to vector 22(5,6), step 77 diverts to step 78 to determine if more segments exist. If more exist, control reverts to step 76 to test another segment.

In FIG. 1, the segments corresponding to vectors 22(6,1) and 22(1,2) have such perpendicular lines. Assuming that the segments are processed sequentially in a clockwise fashion from the data point 22-1, the first intersection will occur in the analysis of the segment corresponding to vector 22(1,2) as stated above. Step 79 in FIG. 6 will determine the distance along the perpendicular to the intersection with the line segment. If the distance is shorter than that distance in comparison with the prior shortest distance, step 80 diverts to step 78 to test another segment. In this particular example the distance from the LP3 launch point along the perpendicular to the segment corresponding to vector 22(1,2) is shorter than the previous distance from the LP3 launch point 12 to the data point 22-1 so that perpendicular is saved in step 81 as the shortest path.

The next five iterations of the loop comprising steps 76 through 81 produce no change in the shortest path as none of the corresponding line segments have a perpendicular that intersects the LP3 launch point 12. However, during the final iteration a perpendicular will exist to the segment corresponding to vector 22(6,1). This will be the shortest distance so that it will be saved in step 81.

When all the segments have been examined, step 78 diverts to step 82 that extends the range of the shortest path by some arbitrary distance along the perpendicular line in step 80 to define an auxiliary way point (AWP). Control then returns from the procedure 73 in FIGS. 5 and 6 to assign the AWP to the IWP in step 54 or to the FWP in step 57 in FIG. 4, as appropriate.

Thus, when the procedure 41 in FIG. 3 as set forth in detail in FIGS. 4, 5 and 6 has been completed, the initial way point (IWP) and a final way point (FWP) will be defined. In the example of FIG. 1, the IWP will be the LP1 or LP2 launch points 10 or 11 or an offset from the LP3 launch point 12. The final way point will be the destination point 13 or an offset from that destination point. If the IWP or FWP is offset from a corresponding launch point or destination point, respectively, the range and bearing from the launch point to the initial way point or from the final way point to the destination point will also have been saved.

Still referring to FIG. 3, the procedure 44 performs various constraint tests. As will become evident later, these tests are also performed in the procedure 62 and during route optimization to assure that the missile or vehicle can maneuver to the next possible course from a current source point (CSP). The current source point initially is the initial way point (IWP), but will also be constituted by intermediate way points. Thus, when the procedure 44 is implemented after a determination that a direct path exists from the IWP to the FWP, the current source point will be the IWP.

Figure 7:
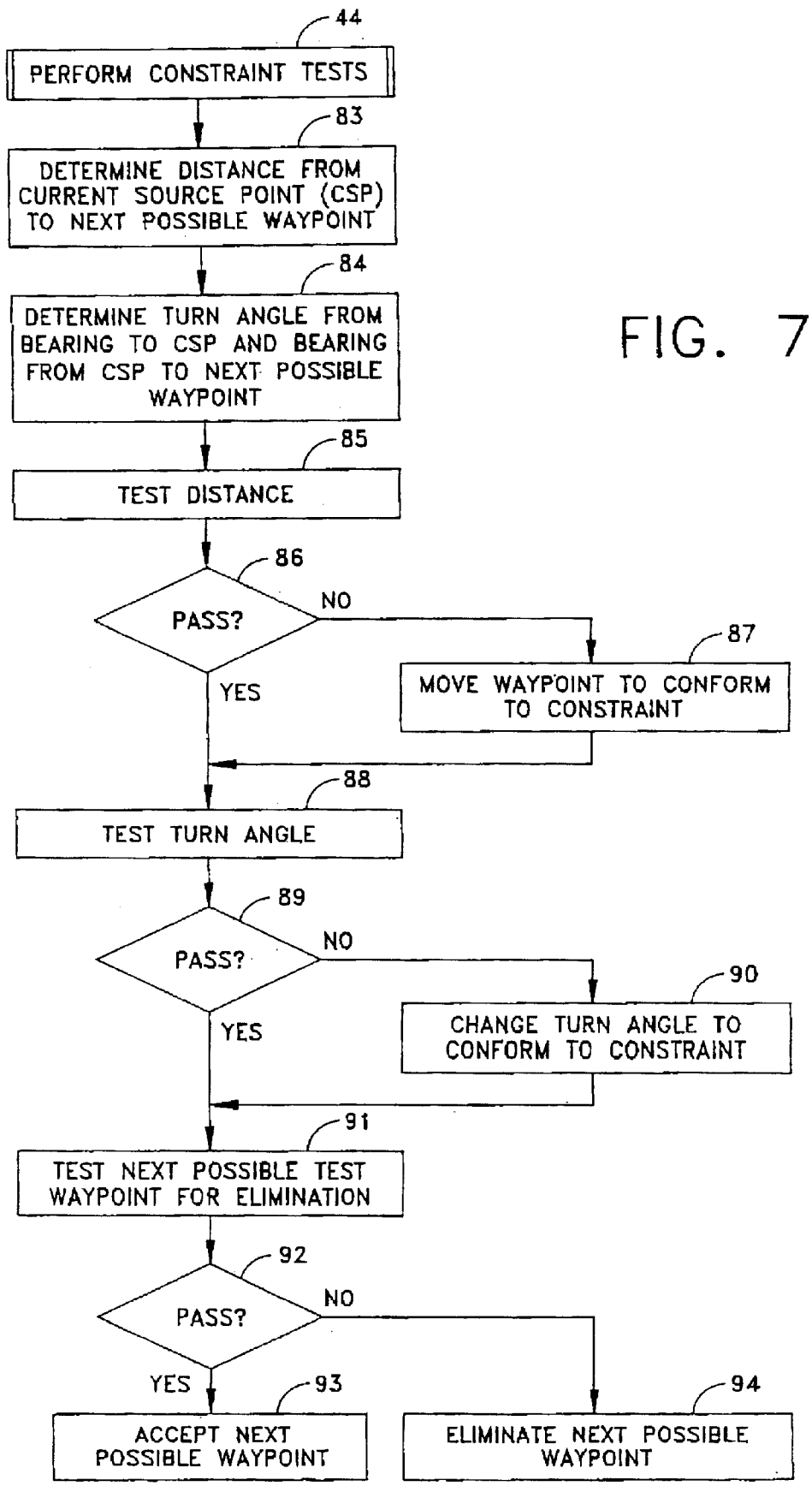
FIG. 7 depicts a procedure of FIG. 3 for performing constraint tests.

Referring to FIG. 7, step 83 determines the distance from the current way point (CSP) to a next possible way point. Step 84 determines the turn angle from a bearing to the CSP to the bearing from the CSP to the next possible way point. The distance is tested against any limit in step 85. For example, there may be a requirement for a minimal distance between turning maneuvers. If the distance does not meet the criteria, step 86 diverts to step 87 to move the way point to conform to the constraint. This movement typically will constitute an extension along the bearing line from the CSP to the next possible way point. Next the system in step 88 will test any turn angle to determine whether it exceeds any limits. Step 89 diverts to step 90 to change that turn angle to conform to the constraint if needed and thus modify the way points as a next possible way point.

Although not required in a direct path calculation, the system can then also test the next possible way point as modified above for elimination in step 91 and then, based upon the characteristics (i.e., distance and angle) of that way point, use step 92 either to accept the way point in step 93 or eliminate the way point in step 94.

Referring again to FIG. 3, if a direct path exists and the constraints are not met, step 45 can divert to a procedure 95 that alters the path accordingly. Such procedures could constitute an error message or some other process, and therefore not disclosed in any detail.

Figure 8:
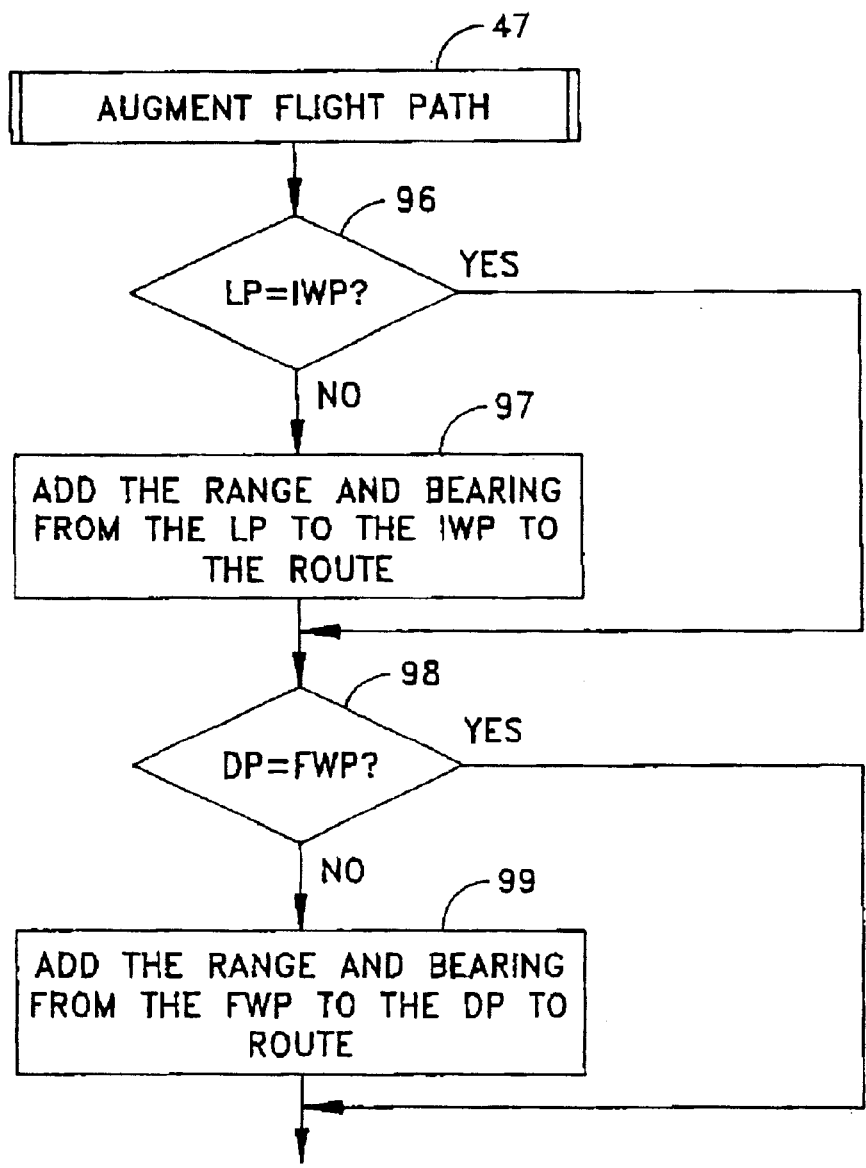
FIG. 8 depicts a procedure of FIG. 3 for augmenting a flight path.

If both the launch point and the destination point are the initial and final way points respectively, step 46 in FIG. 3 diverts to transfer the flight path to the vehicle in step 47. Otherwise the procedure 48 augments the flight path as shown in FIG. 8. As previously indicated, any course between a launch point and the initial way point or a final way point and a destination point is saved. In the procedure of FIG. 8, step 96 determines whether the launch point and the initial way point are identical. If they are not, the saved path from launch point to initial way point path is added to the beginning of the route in step 97. Similarly step 98 determines whether the destination point and the final way point are identical. If they are not, step 99 adds the path from the final way point to the destination point to the route.

Figure 9:
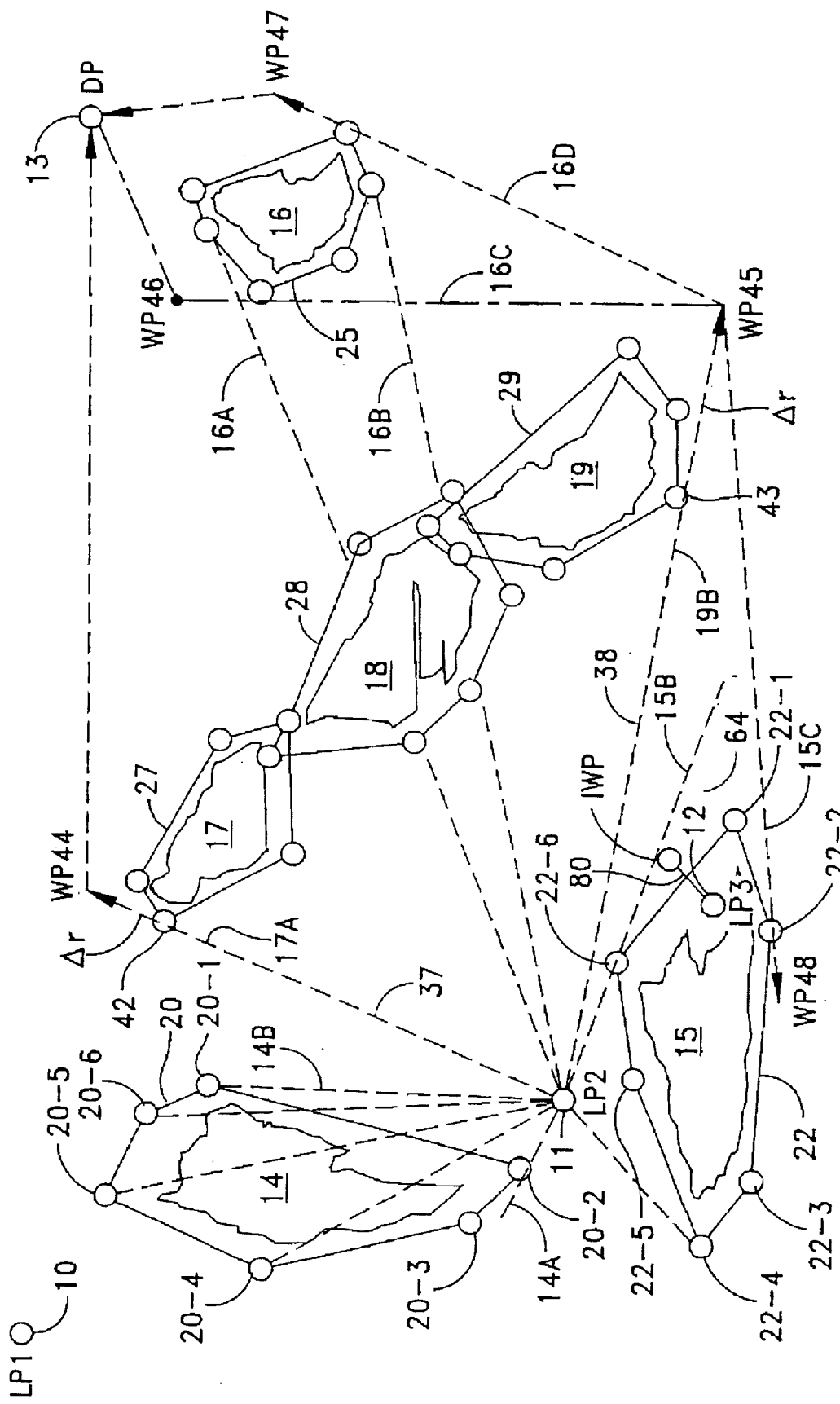
FIG. 9 is an augmented map based upon the map of FIG. 1 useful in understanding the operation of this invention in defining a route from a second launch point to the destination point with intermediate way points.

With this information as background, it will now be possible to discuss the process by which this invention produces a route or flight path with intermediate way points. In FIG. 9, the LP2 launch point 11, as previously indicated, lies outside any landmass min/max rectangle. However, a direct line from the LP2 launch point 11 to the destination point 13 intersects a landmass, namely the landmass 18. Consequently step 43 in FIG. 3 diverts to the procedure 62 to generate a shortest flight path with intermediate way points that avoids all the landmasses before returning to step 46.

Figure 10:
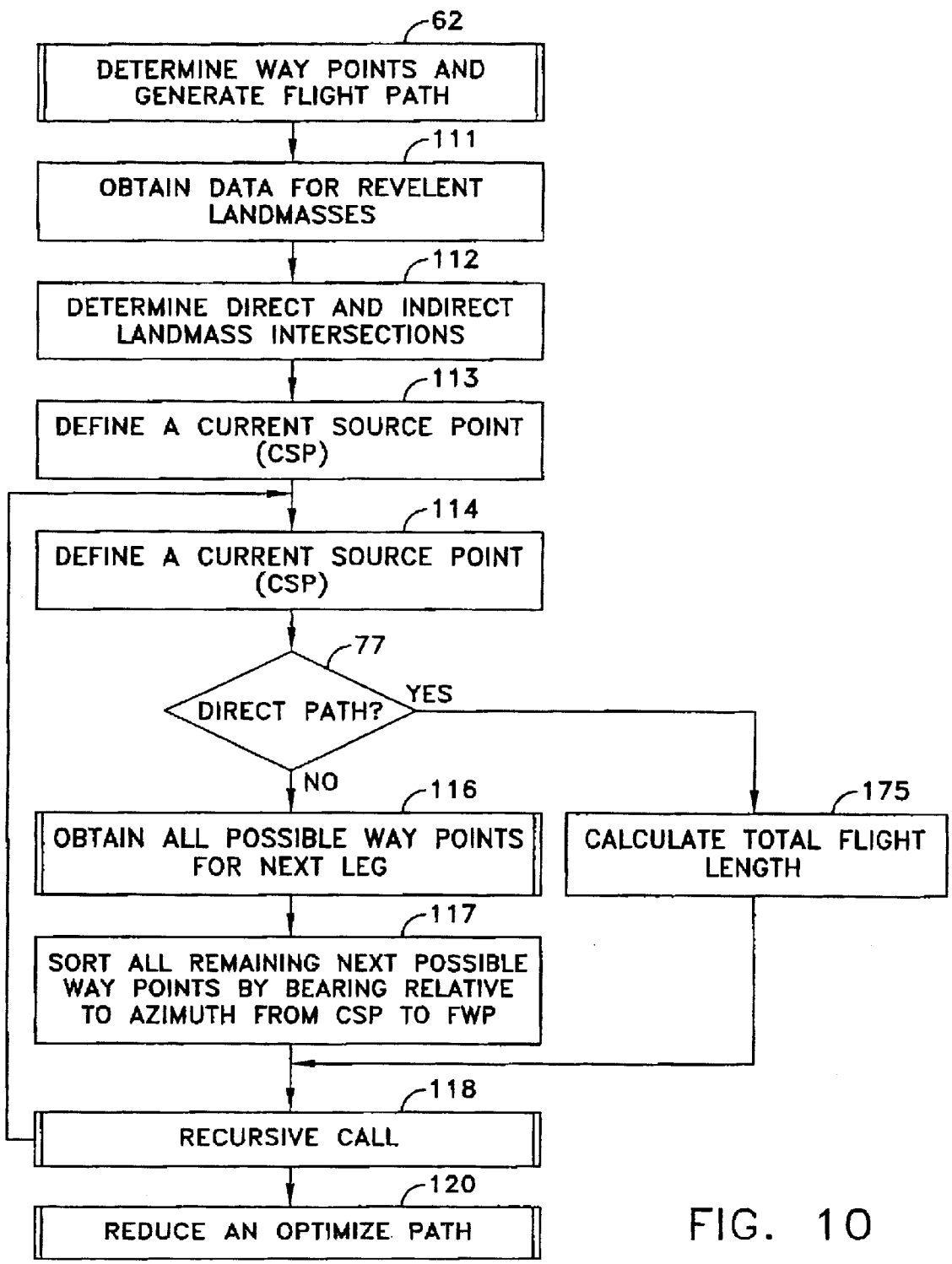
FIG. 10 depicts a procedure of FIG. 3 for determining way points and generating a flight path in accordance with this invention.

Referring to FIG. 10, the procedure 62 starts at step 111 by obtaining data for the relevant landmasses and determining direct and indirect landmass intersections in step 112. As shown in FIG. 9, the landmasses 17, 18 and 19 are intersecting when viewed from the LP2 launch point and are considered to be a single landmass. Step 113 defines a current source point (CSP). On the first pass this is the initial way point, or in the particular example of FIG. 9 the LP2 launch point 12. Step 114 tests for a direct path from the current source point to the final way point. As this duplicates step 43 in FIG. 3, during the first pass through this procedure and in the context of FIG. 9, no direct path exists, so step 115 shifts control to procedure 116 that obtains all possible way points for the next leg.

Figure 11:
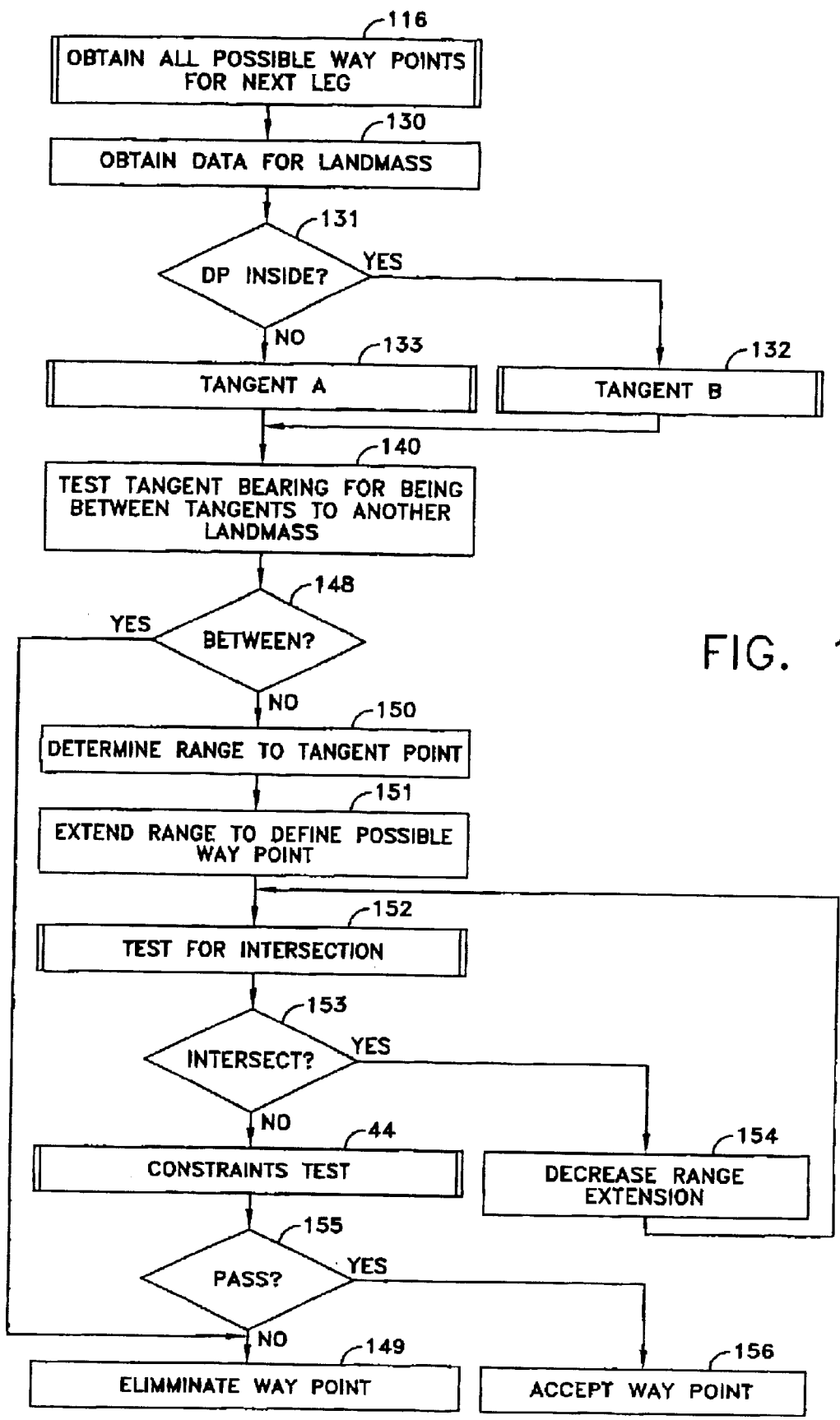
FIGS. 11 through 14 depict other procedures useful in the procedure of FIG. 10.

This procedure is detailed in FIG. 11 but for purposes of an overview of this operation it is sufficient to understand that the procedure 116 obtains, as possible way points, positions defined by extending tangents to each landmass from the current source point to all surrounding landmasses, provided certain criteria are satisfied. In the example of FIG. 9 a pair of tangent lines will be drawn to each of the landmasses 14, 15, and 16 and the combined intersecting landmasses 17 through 19.

The system then uses step 117 to sort the remaining possible way points by a bearing relative to an azimuth from the current source point to the final way point. Using this sorted order is based upon an assumption that a way point with the smallest bearing is likely to produce the shortest path.

A recursive call procedure 118 determines if there are more way points to be processed. If there are, the recursive procedure selects another way point and passes control back to step 114 by moving the current source point to the next possible way point that has passed the test. The details of this recursive call procedure are described in more detail later. At this point, it is sufficient to understand that the recursive call procedure provides an orderly analysis to produce alternative possible flight paths from the LP2 launch point 11 to the destination point 13.

Once the recursive call procedure determines that all possible paths have been defined, control passes to step 120. Step 120 reduces and optimizes that path for transfer the missile or other vehicle.

FIG. 11 depicts the procedure 116 by which all next possible way points from a current source point are obtained. Steps 130 and 131 determine whether the destination point lies outside a landmass polygon but still within the landmass min/max rectangle. If the data for a particular landmass is marked, as previously indicated, control transfers to a procedure 132 described later. Generally, and for other landmasses control passes to step 133 that is a normal procedure for defining tangents to a landmass.

Figure 12:
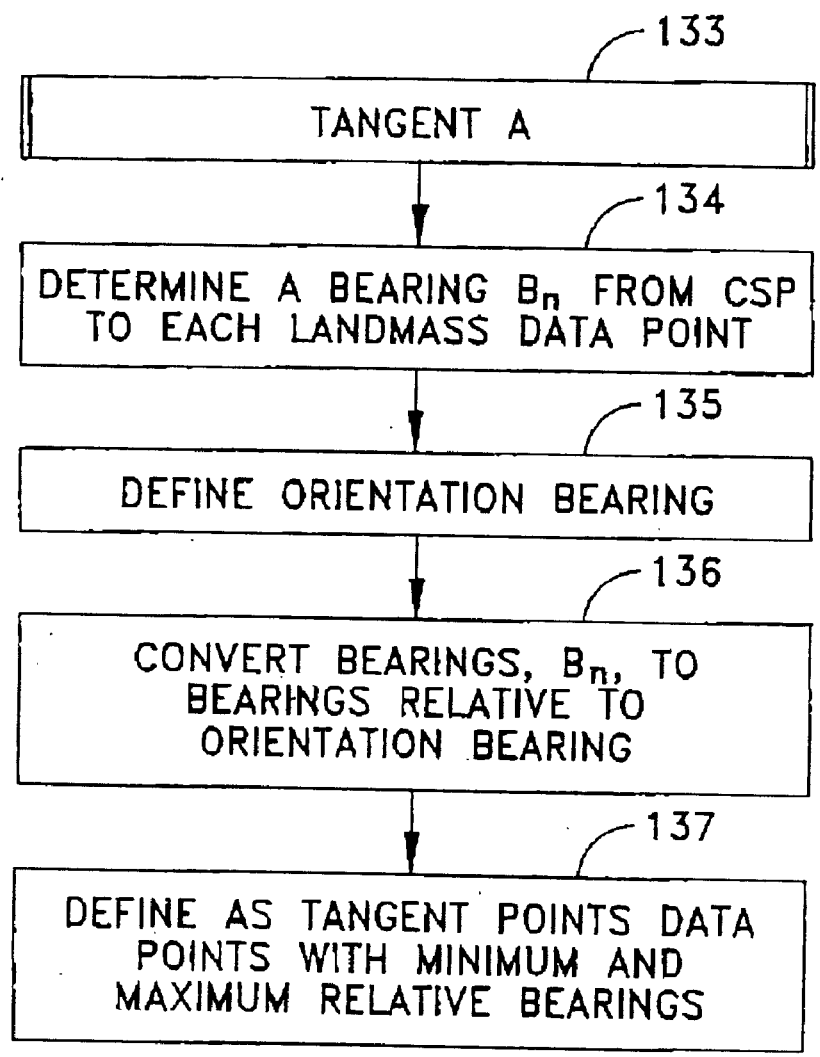

Looking particularly at the LP2 launch point in FIG. 4, the procedure 133 in FIG. 11 determines the tangent to each landmass of interest in an iterative fashion. As shown in FIG. 9, the tangent A procedure 133 produces tangents to the landmasses 14, 15 and 16 and to the combined landmasses 17, 18 and 19 that have been combined as a single landmass in step 112 of FIG. 10. More specifically, and as shown in FIG. 12, the tangent A procedure uses step 134 to determine a bearing from the current source point to each landmass data point. As shown in FIG. 9, bearing lines have been taken from the LP2 launch point 11 to each of the data points 20-1 through 20-6. In step 135 of FIG. 12 the system establishes an orientation bearing. This typically will be one of the ordinal bearings that does not lie within the general range of the bearings to the landmass. For example, with respect to the LP2 launch point 11 and the landmass 14, the orientation bearing could be east, west or south. Any other bearing that is not included in the bearings to the landmass data points can also be used.

Step 136 then converts the bearings, $B_n$ to bearings relative to the orientation bearing and this step enables the bearings having a minimum and maximum relative bearing values to be defined in step 137 as bearings to the tangent points. That is, the tangent points become the data points with the minimum and maximum relative bearings so the tangent bearings 14A and 14B define the tangents to the landmass 14. The procedure 133 in FIG. 12 repeats for each of the remaining landmasses thereby to define tangent lines 15A, 15B, 16A, 16B, the bearing lines 17A and 19B constituting the tangent bearings for the combined landmasses 17, 18 and 19.

Figure 13:
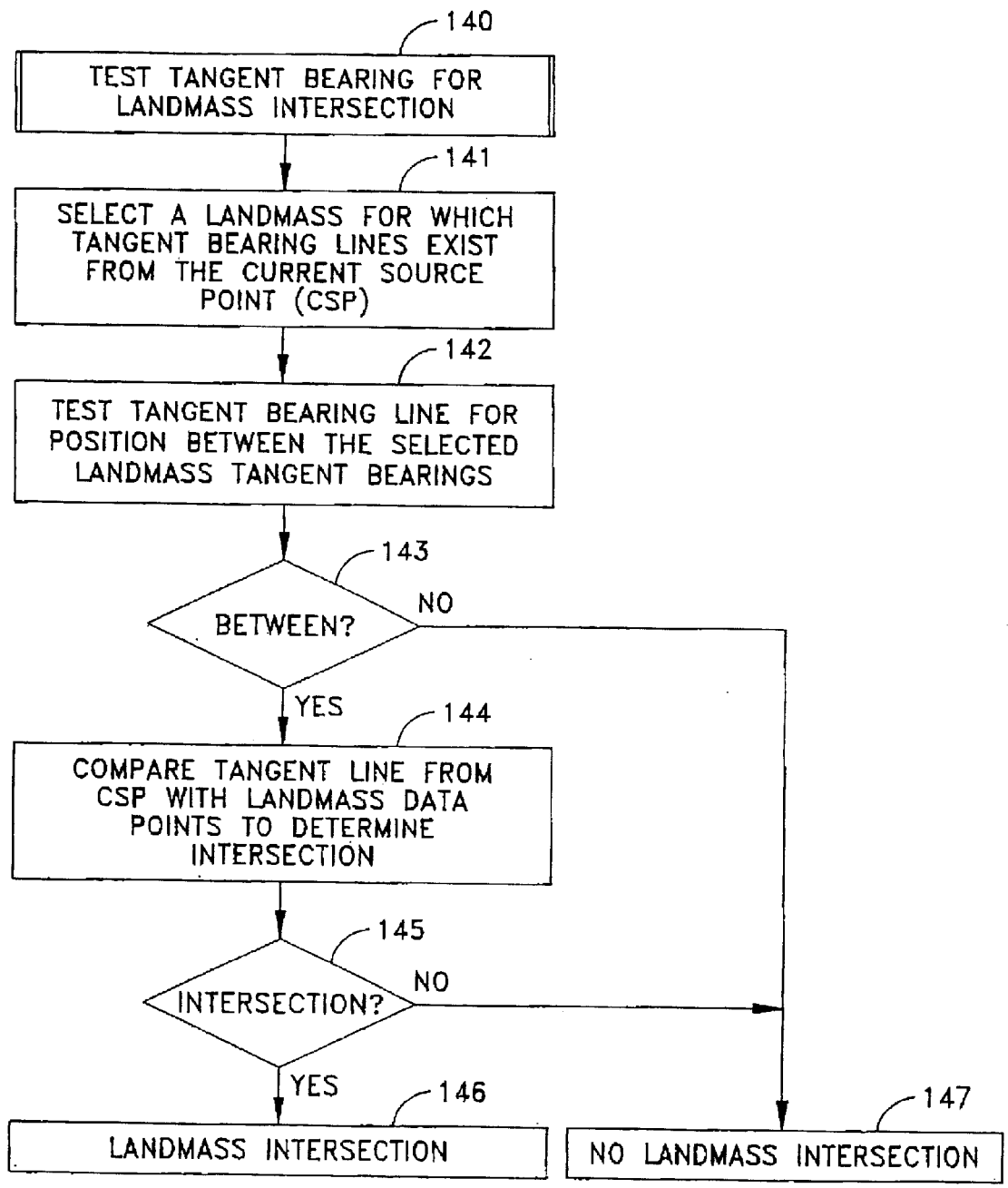

When all the tangent lines from the current source point (i.e., the LP2 launch point at this stage) have been defined a next procedure 140 in FIG. 11 tests each tangent line to determine whether the line intersects a landmass. That is, each bearing line is tested to determine whether it lies between the tangent bearing lines to any other landmass. More specifically, step 141 in FIG. 13 selects a landmass for which tangent bearing lines already exist from the current source point. Step 142 tests the tangent line to the next possible way point to determine if it lies between these existing tangent bearing lines. If the tangent bearing line under test lies between tangent lines to another landmass, step 143 diverts operation to step 144 whereupon the tangent line is tested against all the data points for an intersection with the landmass. If an intersection exists, step 145 exits through step 146 indicating that a landmass intersection exists. If no intersection exists step 145 exits through step 147 to indicate that fact. Similarly, step 143 diverts and exits through step 147 if the tangent line is not between existing tangent lines.

With the example shown in FIG. 9, the bearing lines 16A and 16B lie between the bearing lines 17A and 19B. Consequently they must be checked with respect to those landmasses. However, they need not be checked with respect to any of the other landmasses because they do not lie between the tangent lines to those landmasses. As will be apparent, the foregoing screening test limits the test of steps 144 and 145 to the combined landmasses 17, 18 and 19. In the scenarios of FIG. 9 there is no need to test any of the bearing lines to the landmasses 14 and 15. Consequently this screening test minimizes the processing required to determine intersecting bearing lines. When this test is complete, control returns to step 148 in FIG. 11 that diverts to step 149 and eliminates the bearing lines 16A and 16B because they are intersecting.

Assuming a tangent bearing line does not intersect a landmass, the system uses step 150 in FIG. 11 to determine the range of the tangent point and extends the range in step 151. This defines a possible next way point. That is, in the example of FIG. 9, next possible way points would be generated by steps 150 and 151 for the tangent bearings to the landmasses 15 and 16 and the combined landmasses 17, 18 and 19.

The step of extending the way point is shown in FIG. 9 with respect to the tangent bearings 17A and 19B that are extended by a distance $\Delta r$ to WP44 and WP45 next possible way points. The extension of each bearing line is tested for intersection in a procedure 152. If the extension $\Delta r$ causes the resulting way points to intersect a landmass, step 153 shifts control to step 154 to decrease $\Delta r$, typically by one half. Then control returns to step 152. Once the extension has been determined, step 153 diverts to procedure 44 (FIG. 7) to determine whether the path from the CSP to the next possible way point each way point passes a constraint test. If it does, step 155 diverts to accept the way point in step 156. Consequently when the process of FIG. 11 has been completed with respect to the LP2 launch point, way points will have been produced along the tangent bearing lines to landmasses 14 and 15 and the combined intersecting landmasses 17 through 19. No tangent bearing lines will be extended with respect to the tangent bearing lines 16A and 16B.

Referring again to FIG. 10, after all next possible way points from the current source point have been determined and sorted, the recursive procedure 118 analyzes each of these next possible way points in sorted order by bearing relative from an azimuth from the current source point to the destination point. At this particular stage the LP2 launch point 11 in FIG. 9 is the current source point. Thus the order will be (1) way point 44, (2) way point 45, (3) the way point through data point 23-6, (4) the way point through data point 20-1, (5) the way point through data point 20-2 and (6) the way point through data point 23-4.

Figure 14:
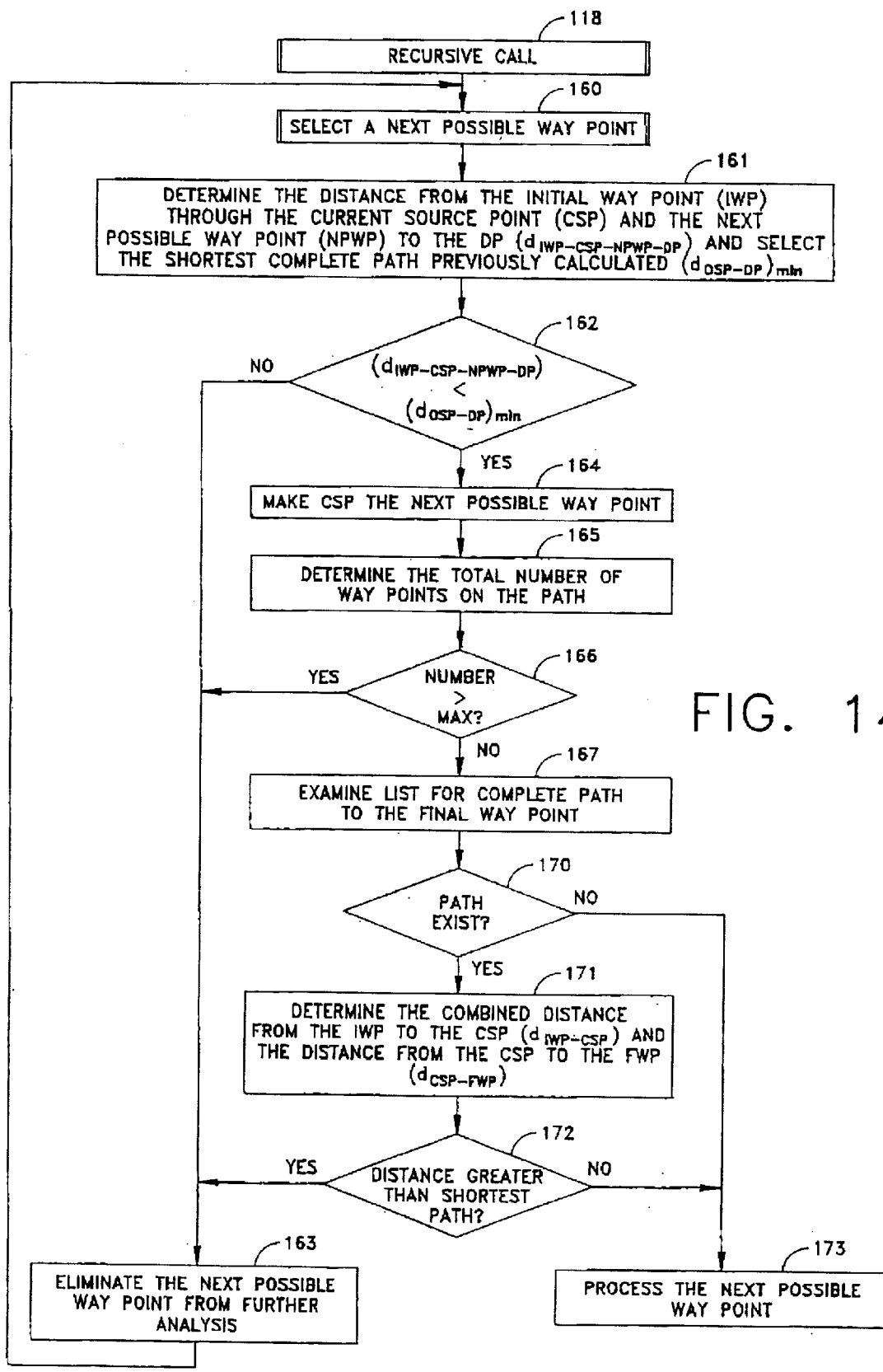

Referring now to FIG. 14, one portion of the recursive procedure determines whether each next possible way point meets certain criteria for further consideration. Step 160 selects the next possible way point (NPWP) with the closest relative bearing to the bearing from the current source point (CSP) to the destination point (DP) as previously described.

A first criteria establishes whether the next possible way point is moving away from the destination point. Step 161 determines the distance from the original starting point (IWP) through the current source point to the next possible way point (NPWP) plus the distance from the next possible way point directly to the destination point. If that distance is greater than the shortest previously calculated complete path, steps 162 and 163 eliminate this next possible way point from further consideration and return control to step 160 to obtain a next one of the sorted next possible way points for analysis.

Otherwise step 162 diverts control to step 164 that substitutes the selected next possible way point for the current source point. Step 165 then determines the total number of way points from the initial way point to the current source point. In this case where the WP44 next possible way point is being analyzed, the total number of way points to the WP44 way point is one, and under a maximum. Step 166 therefore diverts control to step 167. If the maximum value had been exceeded, step 166 would divert to step 163 to eliminate that next possible way point from further analyses as a current source point.

Step 167 determines if a complete path has previously been generated to the final way point. If it has, step 170 diverts control to step 171 that obtains the distance from the initial way point to the current source point ($d_{IWP-CSP}$) plus the distance from the current source point to the final way point ($d_{CSP-FWP}$). If this distance exceeds the distance of a shortest complete path, no additional consideration need be given to a route through the current source point. Consequently step 172 diverts to step 163. If the distance is shorter or if no prior complete path has yet been determined, control will pass from either step 172 or step 170 to step 173 to enable the process to analyze a next possible way point. If, for example, the CSP is the WP44 way point, step 173 would enable other portions of the recursive control procedure 118 to return control to step 114 in FIG. 10.

In a next iteration of FIG. 10, this system replaces the current set point with the way point WP44. As shown in FIG. 9 a direct path will exist from way point 44 to the destination point 13 so the system calculates the total flight length in step 175 and transfers to the recursive call. As the direct flight path is, a priori, the shortest path from the WP44 way point, there is no need to analyze any other paths from the WP44 way point. Consequently the recursive call 118 returns control to designate the LP2 launch point 11 as the current source point and looks to the way point having the next closest bearing to the azimuth from the LP2 launch point 11 to the destination point 13. This is the WP45 way point. In the same fashion as previously described, the WP45 way point is analyzed and designated to be the current source point. No direct path exists so the process, through the recursive call procedure 118, determines tangent bearings from the WP45 way point to all the other landmasses. Tangent bearings 16C and 16D depict two such bearing lines to the landmass 16. Tangent data points would also be produced with respect to the combined landmasses 17, 18, 19 and to each of the landmasses 15 and 16. However, only one of the tangent bearings of the landmasses 15 and 16 would be retained after procedure 117 because both tangent bearings to the landmass 16 intersect the combined landmasses 17, 18 and 19 as does the tangent bearing to the northern portion of landmass 15. This tangent bearing is shown as 15C.

Next the system extends the tangent points to next possible way points WP46, WP47 and WP48. In this case the extensions do not intersect any landmasses. The azimuth from the WP45 way point to the destination point 13 is established and the next possible way points are sorted according to steps 118 and 119. This establishes the order WP47-WP46-WP48.

The system next substitutes the WP47 way point as the current source point and determines whether any of the limits set in recursive call procedure 118 as detailed in FIG. 14, have been exceeded. In addition during this process step 161 tests the distance from LP2 launch point through the way point WP45 as the current set point to the way point WP47 as the next possible way point and the line-of-sight distance the next possible way point WP47 to the destination point. In this case that distance is less than the minimum distance previously calculated so the way point is retained in step 173. A similar step occurs with respect to way point 46. However, way point 48 produces a possible way point that produces a longer path so the way point 48 is eliminated.

Once all these paths have been exhausted, the recursive call procedure 118 in FIG. 10 returns back through the way point WP45 to the LP2 launch point 11 and looks at a next possible way point, namely a way point established by extending the tangent bearing through data point 23-6. The analysis through this way point and through the way points established by extending the tangent bearings through data points 20-1, 20-3 and 20-4 will essentially eliminate these way points from any further possible consideration. Thus when the entire process is completed, three potential paths exist. The first is from the LP2 launch point 11 through the way point 44 to the destination point 13; the second, through the way point WP45 and WP46 way point; and the third, from the WP45 way point through the WP47 way point to the destination point 13.

Once these have been established, the system uses procedure 120 in FIG. 10 to reduce and optimize the various paths, called "rough paths". This step generally will include the constraints procedure 44 of FIG. 7.

Figure 15:
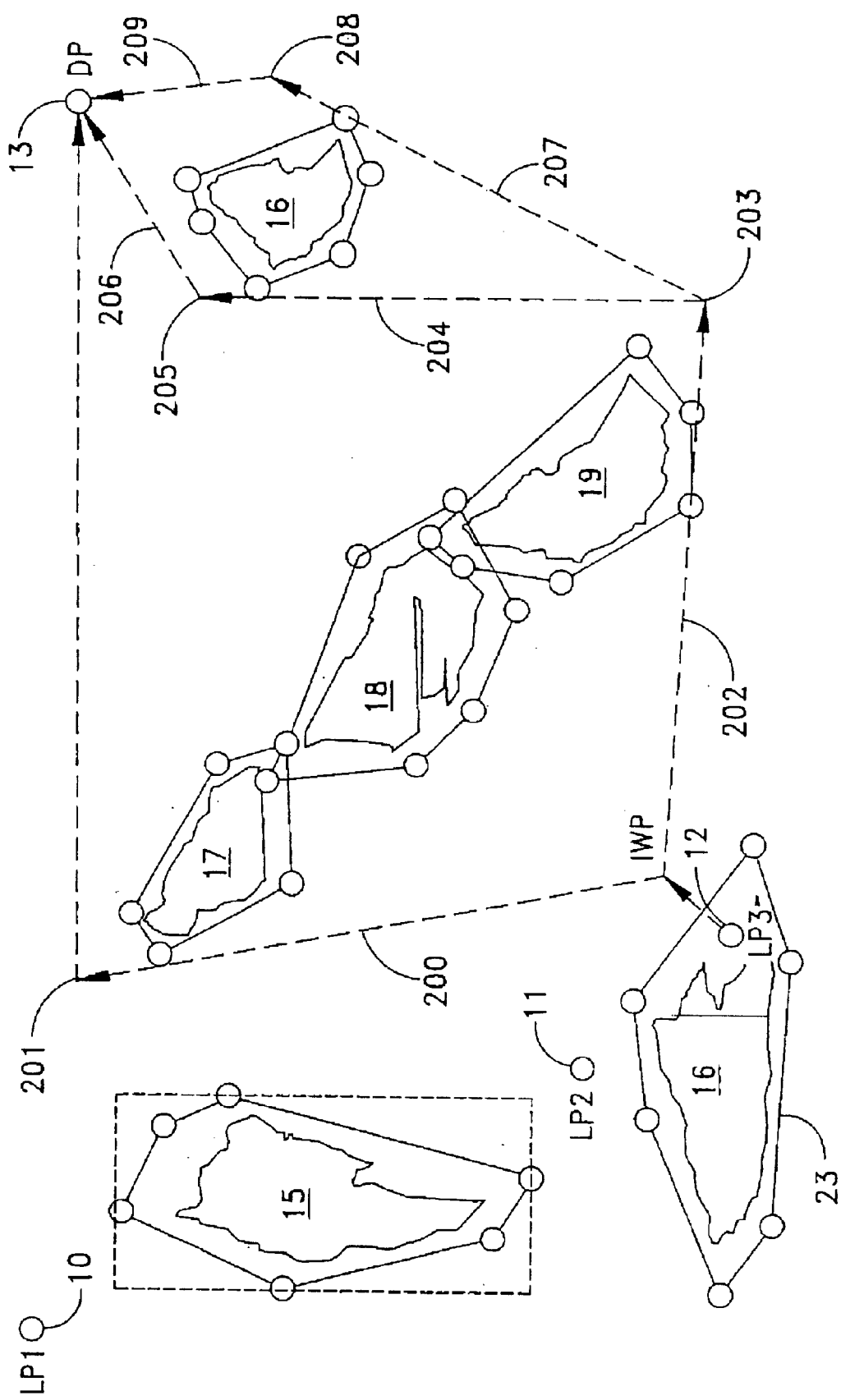
FIG. 15 is a augmented map based upon the map of FIG. 1 useful in understanding the operation of the invention in defining a route from a third launch point to a destination point with intermediate way points.

FIG. 15 depicts a scenario wherein the LP3 launch point 12 lies within the polygon 23 so the previously described process of establishing an initial way point (IWP) outside the landmass is used. Two different tangents from the way point will be again generated with respect to all of the landmasses. However, the tangents generated to the landmass 16 will be eliminated because they intersect the landmasses 17, 18 and 19. In addition tangents past the landmass 15 will eventually be eliminated by virtue of length. The results are three possible routes. The first including a leg 200 to a way point 201 and then directly to the destination point 13. The second includes a leg 202 to a way point 203. Parallel paths then exist with a first path 204 passing through a way point 205 and a successive path 206 moving directly to the destination point 13. The alternate includes a path 207 to a way point 208 and another path from the way point 208 directly to the destination point 13. Again as previously indicated one of these will be selected as the shortest, In this case the path including the path through the way points 203 and 208.

Figure 16:
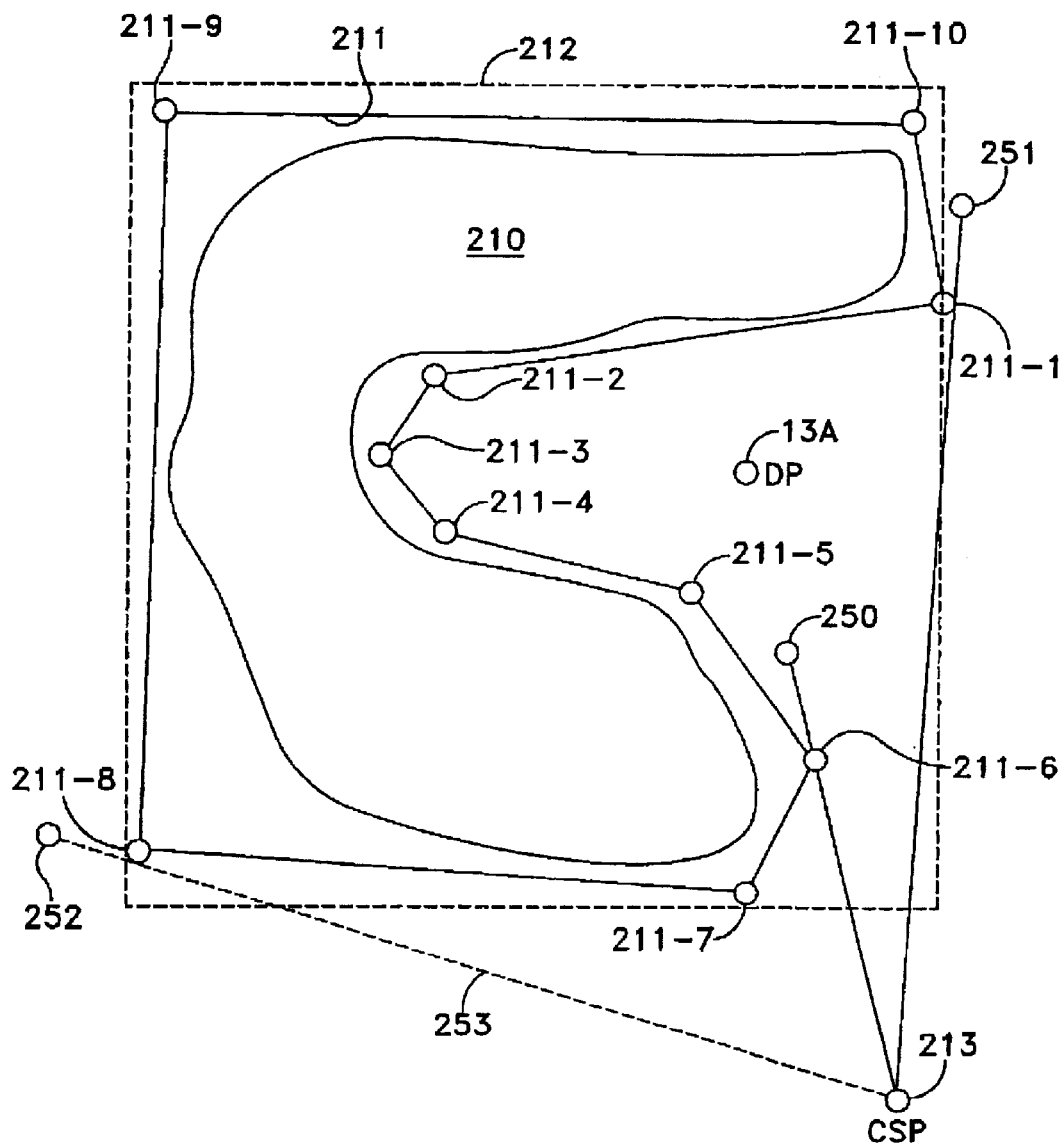
FIG. 16 depicts another scenario in which a destination point is in close proximity to a land mass.

FIG. 16 depicts a landmass 210 with a circumscribing polygon 211 with data points 211-1 through 211-10 and a min/max rectangle 212. A destination point 13A lies outside the polygon 211 but inside the landmass min/max rectangle 212. The use of the tangent A procedure 133 in FIG. 11 may not produce a shortest path from a current source point 213 to the destination point 13A. In FIG. 16 the tangent procedure would produce tangent bearings to data points 211-8 and 211-1. The way point along the later bearing would be intermediate the latitudes of data points 211-1 and 211-10.

Figure 17:
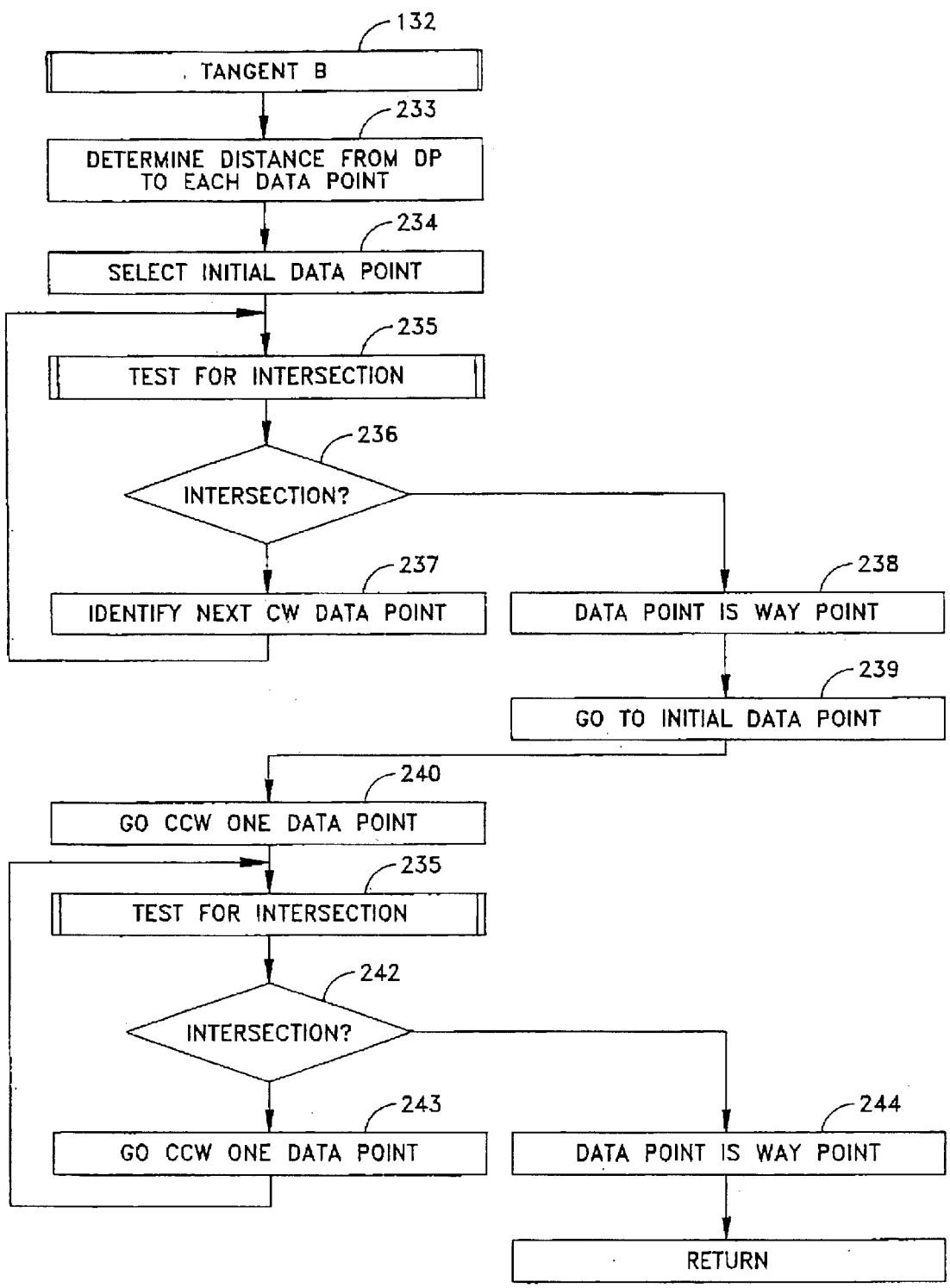
FIG. 17 depicts a procedure used in FIG. 10 for defining way points for the scenario shown in FIG. 16.

When this condition exists, as previously indicated, step 131 in FIG. 11 diverts to the tangent B procedure 132 shown in detail in FIG. 17. In this procedure step 233 determines the distance from the DP destination point 13A to each data point on the landmass. Step 134 selects the closest data point; namely data point 211-5 in this particular example, as an initial point. A line is projected from this data point 211-5 to the CSP 213. Procedure 235 determines that the line intersects the landmass, so step 236 shifts control to step 237 to identify a next data point 211-6. No intersection exists, so step 238 identifies a tangent bearing to the data point 211-6 in FIG. 16.

Next step 239 returns to the initial point, in this case the data point 211-5, and begins an analogous loop comprising steps 240 through 244 to select a next data point in a counter clockwise direction. In FIG. 16 this is data point 211-4. A line from the data point 211-4 to the CSP 213 intersects the landmass as a result of an analysis by the procedure 235. So the test in step 242 transfers control to step 243 to identify a next data point, namely data point 211-3. Intersections continue to be sensed until step 243 identifies data point 211-1. The second tangent bearing is taken through the data point 211-1. Once identified, the procedure set forth in FIG. 10 extends the range (step 151) to identify, in this particular example, a way point 250 with a direct path to the destination point 13A. An alternate way point 251 on the tangent through the data point 211-1 will be eliminated through the various tests previously described.

FIG. 16 demonstrates the difference between the operations of the procedures 132 and 133 in FIG. 11. Specifically, both produce the way point 251. However, while the procedure 132 produces the way point 250, the procedure 133 produces a way point 252 shown along a bearing line 253 (shown by a dashed line) through the data point 211-8. In this particular example, the test of step 161 in FIG. 14 precludes way point 252 from analysis as a next possible way point. In turn, the CSP would be precluded as an intermediate way point.

Figure 18:
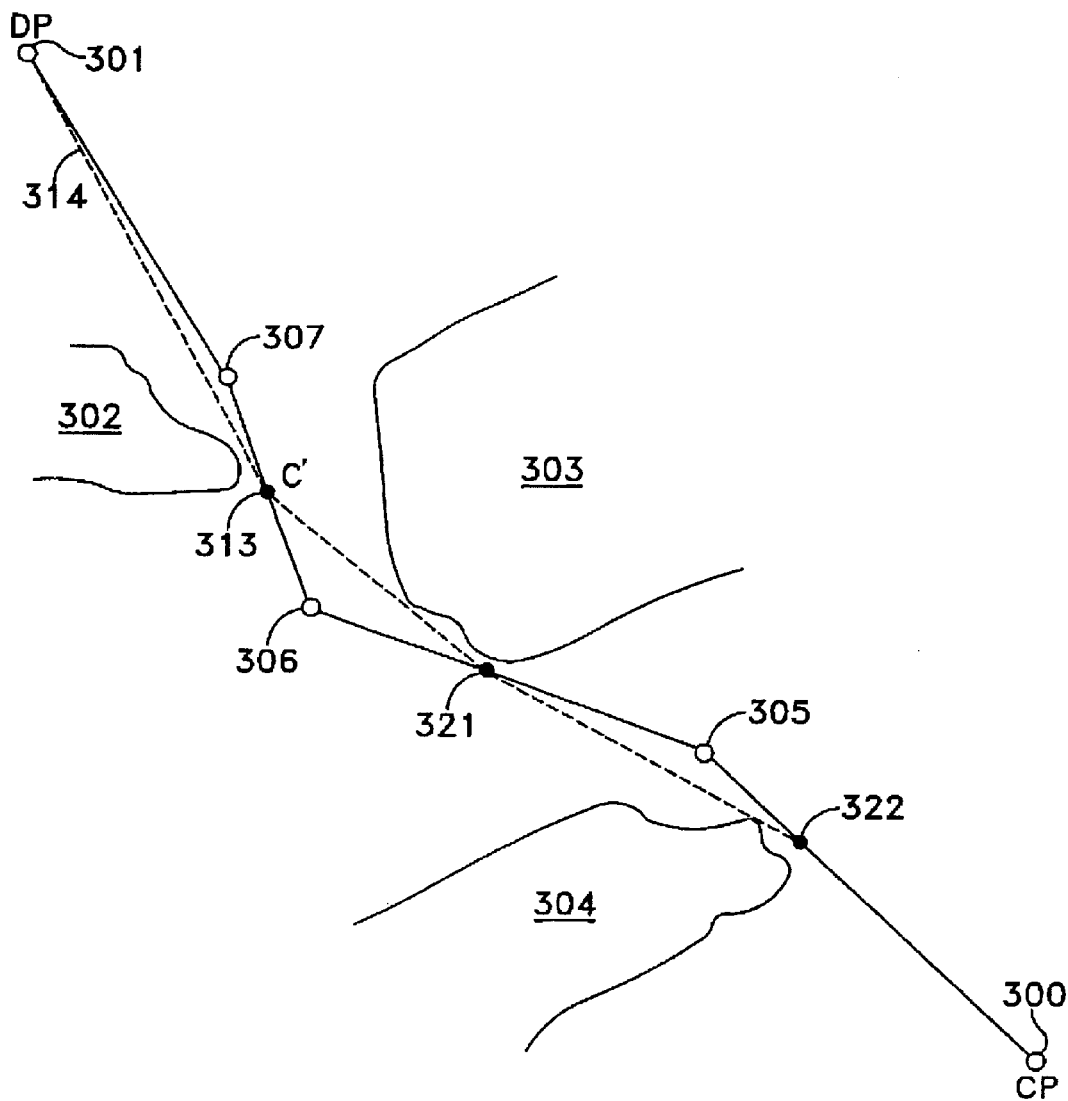
FIG. 18 depicts a rough path from a launch point to a destination point as achieved in accordance with aspects of this invention.

Once all the possible paths have been determined in accordance with the procedure shown particularly in FIG. 10, control transfers to the procedure 120 to further modify these paths. As previously indicates each path obtained as a result of the operation of FIG. 10 is a "rough path". FIG. 18 depicts a scenario in which this procedure is particularly well adapted for reducing and optimizing a particular rough path while FIGS. 19A and 19B constitute a flow chart that defines the particular procedure. Referring specifically to FIG. 18, the rough path between a LP launch point 300 and a DP destination point 301 avoids landmasses 302, 303 and 304 by using way points 305, 306 and 307. The procedure of FIGS. 19A and 19B generally will reduce the path length and, in some situations, may eliminate one or more way points.

Figure 19A:
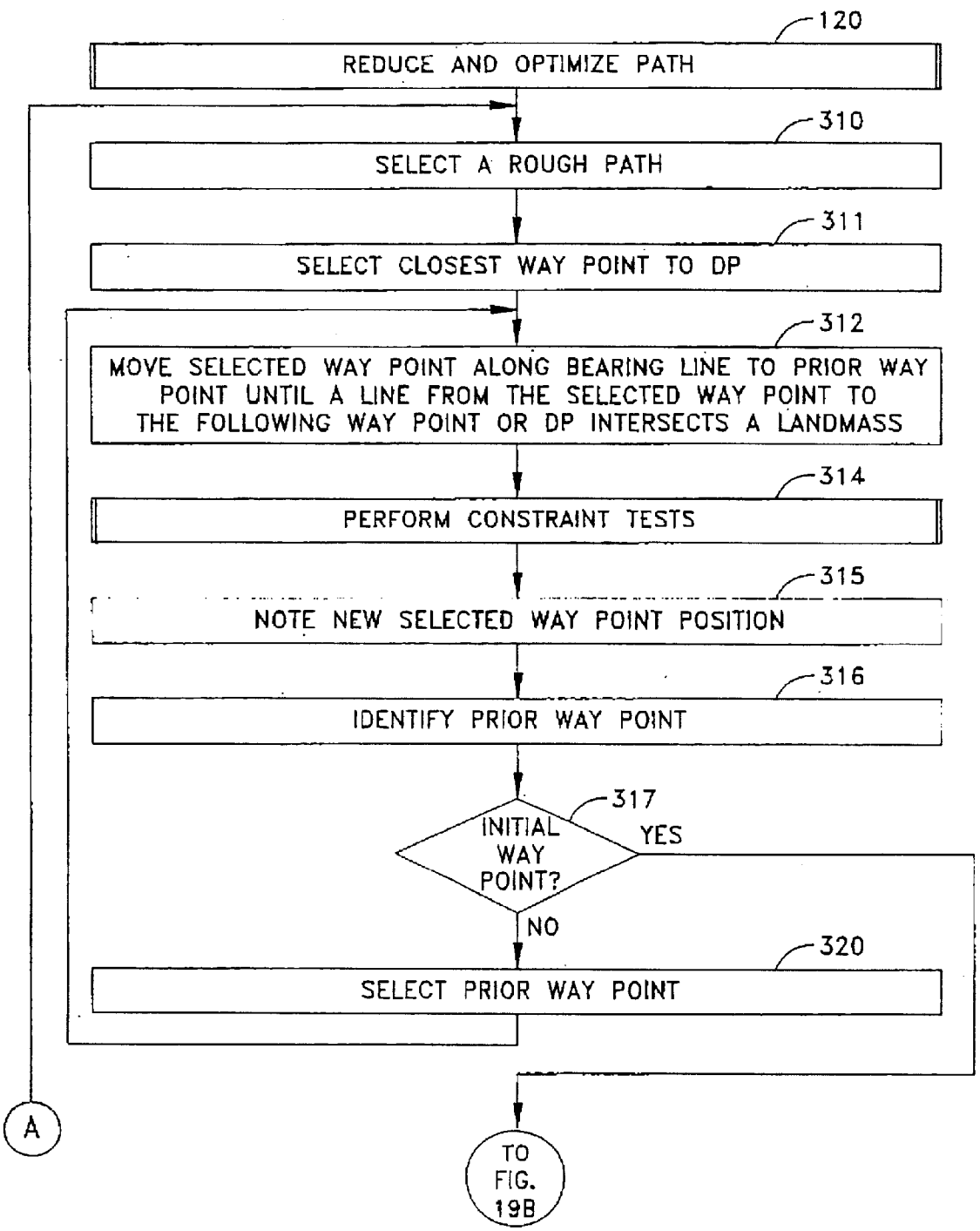
FIGS. 19A and 19B depict a procedure for reducing and optimizing the rough path shown in FIG. 18 to obtain a selected shortest optimized and reduced path.
Figure 19B:
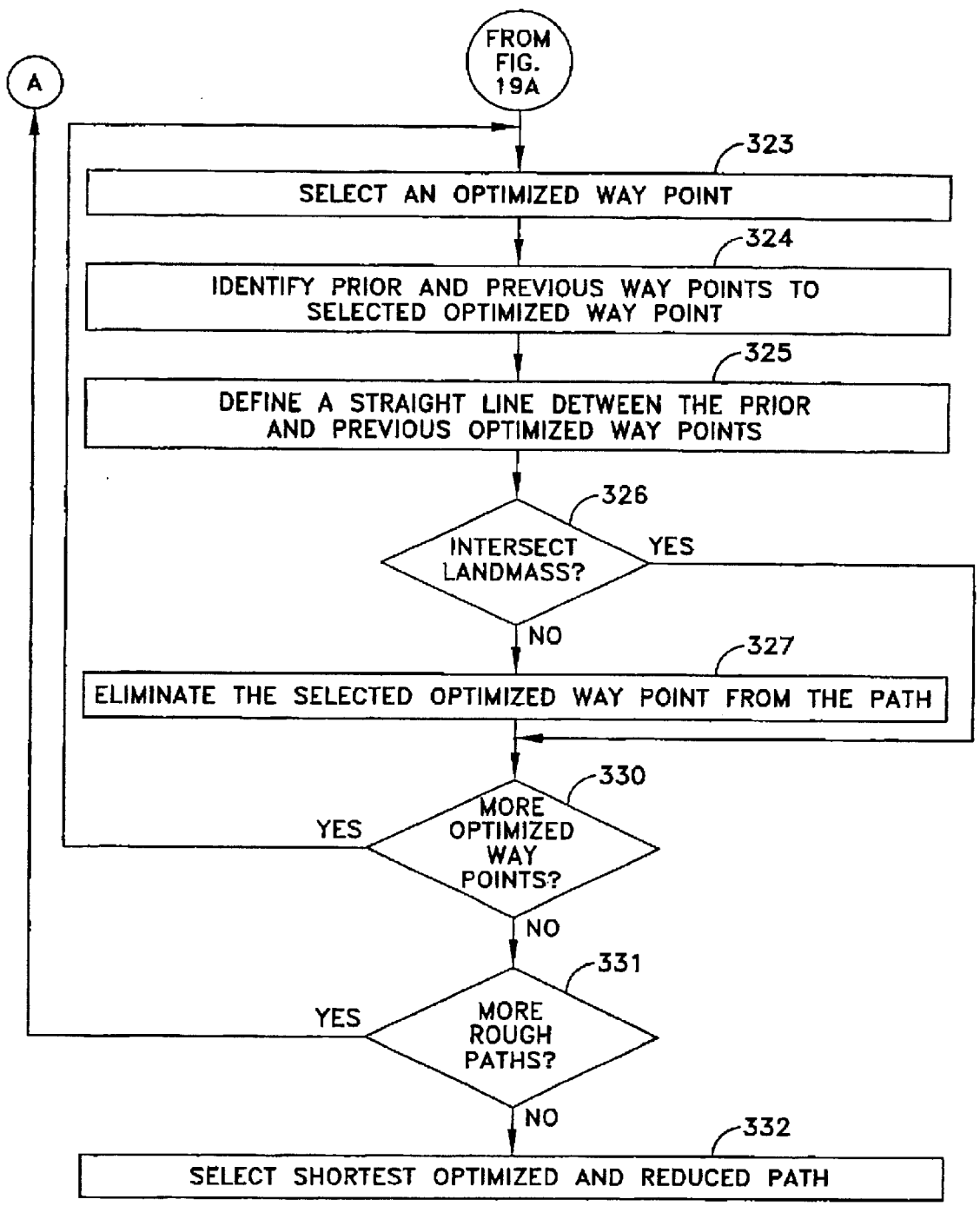

Referring to FIG. 19A, step 310 selects a particular rough path from the rough path produced by the operation of FIG. 10. Assuming that the path of FIG. 18 is obtained, step 311 in FIG. 19A selects the closest way point to the destination point. In this particular case that is the way point 307.

Now the system enters a loop to backtrack along the rough path. Referring to FIGS. 18 and 19A, step 312 in FIG. 19A moves the selected way point 307, along the bearing line toward the prior way point 306. This motion continues until a line from the new location of way point 307 intersects a landmass. In FIG. 18 this occurs when the way point 307 moves to become way point 313. Next the system performs a constraint test according to procedure 44 previously described with respect to FIGS. 3 and 7. These tests determine whether the vehicle is capable of maneuvering from the bearing line between the way point 306 and the way point 313 and the new bearing line from the way point 313 to the destination point 301 (i.e., a bearing line represented by dashed line 314). If the maneuver is possible, the new way point 313 is accepted and the way point 307 deleted. Step 315 notes this way point position.

Next the system uses step 316 to identify a prior way point and test that way point in step 317 to determine if that prior way point is the initial way point. If not, the prior way point is selected in step 320. More specifically, after identifying way point 313, the system will identify the way point 306. As that way point 306 is not the initial way point, it is selected in step 320 and the process repeats beginning with step 312 in FIG. 19A. This will substitute way point 321 for way point 306. Step 316 then identifies the way point 305 as a prior way point, but this is not the initial way point. So the loop replaces way point 305 with way point 322. As the next prior way point is the launch point 300, step 317 in FIG. 19A diverts control to step 323 in FIG. 19B that begins a test to eliminate any unnecessary way points.

Thus, when the process identified by steps 311 through 320 have been completed, the rough path has been modified so that the new rough path extends from the launch point 300 and through the way point 322, the way point 321, the way point 313 to the destination point. As will be apparent in each of these new route segments such as the route segment 314 constitutes one side of a triangle including the old way point. By definition, therefore, each of the new segments is shorter than the prior path. Thus, this process reduces the selected rough path length.

Defining each of the new way points as reduced path way points, the system next determines whether any way points can be deleted. For example, assume that the system selects the way point 313 as a first reduced path way point. Step 324 then identifies subsequent and prior way points 301 and 321 along the path. Step 225 defines a straight line between these way points, (i.e., a straight line between the way point 321 and the destination point 301). Step 326 determines whether this line intersects the landmass. In this case a straight line from the way point 321 to the destination point 301 does not intersect any landmass. In that event, step 326 diverts to step 327 that eliminates the selected reduced path way point 313 to change the path starting from the launch point 300 through the way point 322 and the way point 321 to the destination point 301. Step 330 in FIG. 19B determines whether additional way points need to be reviewed. In this particular case the next way point to be analyzed is the way point 321. Now the subsequently and prior reduced path way points are the destination point 301 and way point 322. A straight line defined in step 325 intersects the landmass 303, so step 326 diverts to step 330 to determine it additional way points are to be processed. Likewise testing the way point 322 will produce a line between the launch point 300 and the way point 321 that intersects the landmass 304 so the way point 322 remains in the route. Consequently when the path is complete, a new route extends from the launch point 300 through the way point 322 and the way point 321 to the destination point 301. The elimination of the way point 313 has two effects. First, it further reduces the length of the path. Second, it eliminates a way point. As the number of way points are generally limited, the reduction of way points has an obvious positive effect. First, it further reduces the length of the path. Second, it eliminates a way point. As the number of way points are generally limited, the reduction of way points has an obvious positive effect.

Once all the way points on a path have been analyzed, step 330 diverts control to step 331 that determines whether additional remote paths need to be processed. Control returns from step 331 to step 310 in FIG. 19A if more paths exist. Otherwise control diverts to step 332 whereupon each of the optimized and reduced paths is analyzed to identify the shortest path and this path is then the path that will be transferred as the route, subject to augmentation according to steps 46 and procedure 48 in FIG. 3.

Therefore there has been described in accordance with this invention a method for generating one or more rough paths that avoid restricted areas by the use of different way points. Each rough path is optimized and reduced, and the shortest of the optimized and reduced paths is selected. The various procedures set forth in this disclosure enable this entire process to occur on an essentially real time basis. Moreover, the method takes into account a number of practical variations such as the potential location of a destination point in close proximity to a landmass area that would otherwise be avoided. Further the method takes into account any constraints on the operation of a particular vehicle such as a missile that is being projected along that path. Finally the system provides a simple process for transferring the way point information including bearings and ranges into the missile or other vehicle for use during flight or other trajectory motion.

This application has been defined in terms of particular steps and procedures with certain coordinate systems. It will be apparent that other steps and procedures and coordinate systems could be substituted while still attaining the same or most of the results and advantages of this invention. Many other modifications can also be made to the disclosed method without departing from the invention. Therefore, it is the intent of the appended claims to cover all such variations and modifications as come within the true spirit and scope of this invention.

What is claimed is:

1. A method for establishing a route with at least one way point by which a steerable vehicle will maneuver between a current source point and a destination point that avoids at least one intermediate obstacle, said method comprising the steps of:

defining first and second bearing lines extending from the current source point to first and second tangents, respectively, of each of the at least one intermediate obstacle;

extending each of the defined bearing lines an incremental distance beyond the tangent thereof with a corresponding obstacle and thereby defining a next possible way point along that bearing line; and converting each next possible way point to a way point for the route.

2. A method as recited in claim 1 wherein a plurality of obstacles are intermediate a current source point and the destination point requiring a plurality of way points along the route, said steps of defining bearing lines and extending bearing lines being performed iteratively by substituting each next possible way point as a current source point until a route to the destination point is defined.

3. A method as recited in claim 2 wherein the iterative process of defining bearing lines and extending bearing lines produces a plurality of paths to the destination point, said method additionally comprising the step of selecting the shortest path to the destination point as the route.

4. A method as recited in claim 3 wherein the steerable vehicle is characterized by a constraint on the maneuverability thereof, said defining of a next possible way point including, during each iteration, checking a path to the current source point and a path from the current source point to the next possible way point for compliance with the constraint and modifying the next possible way point to conform to the constraint.

5. A method as recited in claim 3 wherein each of the plurality of paths has a total length, said method comprising the additional step of modifying the path to reduce the total length thereof.

6. A method as recited in claim 5 wherein each intermediate way point in a path is moved, in sequence starting from the way point most proximate the destination point, along the bearing thereto until a line from the intermediate way point being moved to the successive one of the way point and destination point becomes tangent an obstacle.

7. A method as recited in claim 5 wherein a given way point is eliminated from the path if there exists a straight line path between adjacent ones of the way or destination points that avoids any obstacle.

8. A method as recited in claim 2 wherein the steerable vehicle is characterized by a constraint on the maneuverability thereof, said defining of a next possible way point including, during each iteration, checking a path to the current source point and a path from the current source point to the next possible way point for compliance with the constraint and modifying the position of the next possible way point to conform to the constraint.

9. A method as recited in claim 8 wherein the iterative process of defining bearing lines and extending bearing lines produces a plurality of paths between the starting and destination points, said method additionally comprising the step of selecting the shortest path between the starting and destination points.

10. A method as recited in claim 9 comprising the additional step of modifying the path to reduce a total length thereof.

11. A method as recited in claim 10 wherein each intermediate way point in a path is moved, in sequence starting from the way point most proximate the destination point, along the bearing thereto until a line from the intermediate way point being moved to one of the next possible way point and destination point becomes tangent an obstacle.

12. A method as recited in claim 10 wherein a given way point is eliminated from the path if there exists a straight line path between the adjacent ones of the way or destination points that avoids any obstacle.

13. A method as recited in claim 10 wherein one of the constraints is a minimum travel distance, said checking and modifying steps extending a range to a next possible way point when a range from the current source point to the next possible way point is less than the minimum travel distance.

14. A method as recited in claim 10 wherein one of the constraints is a turning angle constraint, said modifying step modifying a turning angle from a path to the current source point and the path from the current source point to the next possible way point when that turning angle is fails to meet the turning angle constraint.

15. A method for establishing a route for a missile between a launch point and a destination point that avoids at least one intermediate landmass, said method comprising the steps of:

establishing a data base of landmasses that circumscribe the each landmass within a polygon defined by a plurality of data points;

defining an initial current source point relative to the launch point and a final way point relative to the destination point;

defining, by iterative processing, a plurality of rough paths between the initial current source point and the final way point by:

generating first and second bearing lines from the current source point to first and second tangents of the polygons surrounding each intermediate landmass;

defining a next possible way point relative to the tangent of each bearing line to one of the polygons;

converting each next possible way point to an intermediate way point for the rough path; and substituting an intermediate way point as the current source point; and selecting one of the rough paths as the route for the missile between the launching and destination points.

16. A method as recited in claim 15 wherein the missile is characterized by at least one maneuvering constraint and said conversion of each next possible way point to a way point includes the step of modifying the position of next possible way point if the path to the next possible way point fails to meet a maneuvering constraint.

17. A method as recited in claim 16 wherein one of the maneuvering constraints is a minimum travel distance after a turning movement, said modifying step extending a range to a next possible way point when a range from the current source point to the next possible way point is less than the minimum travel distance.

18. A method as recited in claim 16 wherein one of the maneuvering constraints is a turning angle constraint, said modifying step modifying a turning angle from a path to the current source point and the path from the current source point to the next possible way point when that turning angle fails to meet the turning angle constraint.

19. A method as recited in claim 15 wherein said step of defining a next possible way point includes extending the bearing line beyond a corresponding tangent by an incremental distance.

20. A method as recited in claim 19 comprising the additional step of modifying the path to reduce a total length thereof.

21. A method as recited in claim 20 wherein each intermediate way point in a path is moved, in sequence starting from the way point most proximate the destination point, along the bearing thereto until a line from the intermediate way point being moved to the successive one of the way point and destination point becomes tangent an obstacle.

22. A method as recited in claim 20 wherein a given way point is eliminated from the path if there exists a straight line path between adjacent ones of the way and destination points that avoids any obstacles.

23. A method as recited in claim 19 comprising the additional step of reducing the incremental distance if the extended bearing line intersects a polygon.

24. A method as recited in claim 15 wherein the missile is characterized by flight maneuver constraints and said conversion of each next possible way point to a way point includes the step of modifying the position of next possible way point if the path to the next possible way point violates the maneuvering constraint.

25. A method as recited in claim 24 wherein the iterative process of defining way points produces a plurality of rough paths between the initial and final way points, said method additionally comprising the step of selecting the shortest rough path and thereafter modifying the position of each way point if the selected rough path to the way point fails to meet the maneuvering constraints.

26. A method as recited in claim 15 wherein the launch point lies within the polygon around a corresponding landmass and said step of defining the initial current source point includes. the steps of:

defining a shortest path from the launch point to a segment on the polygon; and incrementally increasing the shortest path to define the initial current source point.

27. A method as recited in claim 15 wherein the destination point lies within the polygon around a corresponding landmass and said step of defining the final way point includes the steps of:

defining a shortest path from the destination point to a segment on the polygon; and incrementally increasing the shortest path to define the final way point.

28. A method as recited in claim 15 wherein each landmass is further defines by a rectangle circumscribing a polygon, said method additionally testing, during each iteration, whether the destination point lies within the rectangle but outside the polygon associated with a landmass, said method comprising an alternative step for generating the first and second bearing lines to that landmass based upon the relative positions of the current source point, the destination point the corners of the polygon.

29. A method as recited in claim 15 wherein said step of connecting a next possible way point to an intermediate way point includes testing the next possible way point against predetermined criteria.

30. A method as recited in claim 29 wherein said step of connecting a next possible way point to an intermediate way point includes determining whether the total number of way points in the rough path exceeds a maximum.

31. A method as recited in claim 29 wherein said step of connecting a next possible way point to an intermediate way point includes determining whether a distance to the next possible way point from a current source point exceeds a distance from the current source point to the destination point.

32. A method as recited in claim 29 wherein said step of connecting a next possible way point to an intermediate way point includes, after a first rough path exists, whether the sum of a distance from the initial way point to the current source point plus a distance from the current source point to the destination point exceeds the shortest possible path.

* * * * *